United States Patent
Oto

(10) Patent No.: US 9,035,952 B2
(45) Date of Patent: May 19, 2015

(54) IMAGE PROCESSING APPARATUS, IMAGE PROCESSING METHOD, AND COMPUTER-READABLE MEDIUM

(75) Inventor: Hiroshi Oto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 347 days.

(21) Appl. No.: 13/048,586

(22) Filed: Mar. 15, 2011

(65) Prior Publication Data

US 2011/0242616 A1 Oct. 6, 2011

(30) Foreign Application Priority Data

Mar. 30, 2010 (JP) .................................. 2010-079439

(51) Int. Cl.
G06T 11/20 (2006.01)
G06K 9/46 (2006.01)
G06K 9/48 (2006.01)

(52) U.S. Cl.
CPC ....................................... *G06K 9/481* (2013.01)

(58) Field of Classification Search
CPC .. G06T 11/60; G06K 9/00523; G06K 9/0053; G06K 9/00442; G06K 9/4604; G06K 9/44; G06K 9/52
See application file for complete search history.

(56) References Cited

U.S. PATENT DOCUMENTS

| 6,404,921 | B1 | 6/2002 | Ishida | |
| 2005/0238244 | A1* | 10/2005 | Uzawa | 382/242 |
| 2008/0150968 | A1* | 6/2008 | Kihara | 345/666 |
| 2009/0074302 | A1* | 3/2009 | Kishi | 382/224 |

FOREIGN PATENT DOCUMENTS

| JP | 04-116690 A | 4/1992 |
| JP | 07-160870 A | 6/1995 |
| JP | 09-292874 A | 11/1997 |
| JP | 3026592 B | 3/2000 |
| JP | 2005-310070 A | 11/2005 |

(Continued)

OTHER PUBLICATIONS

U.S. Appl. No. 13/048,546, filed Mar. 15, 2011. Applicant: Hiroshi Oto.
U.S. Appl. No. 13/048,546, filed Mar. 15, 2011, Applicant: Hiroshi Oto.
Japanese Office Action dated Dec. 6, 2013, in Japanese Patent Application No. 2010-079439.

(Continued)

*Primary Examiner* — Mark Zimmerman
*Assistant Examiner* — Nurun N Flora
(74) *Attorney, Agent, or Firm* — Fitzpatrick, Cella, Harper & Scinto

(57) ABSTRACT

An image processing apparatus comprises an anchor point candidate information extraction unit configured to decide coordinates of anchor point candidates and attributes of the anchor point candidates based on a plurality of predetermined extraction rules and a sequence of coordinate points that expresses an outline of image data; an anchor point decision unit configured to decide an anchor point candidate to be reduced based on the attributes of the anchor point candidates and priority orders set in advance for the attributes, and configured to decide anchor points by reducing the decided anchor point candidates to be reduced; a control point coordinate decision unit configured to decide control point coordinates based on the anchor points decided by the anchor point decision unit and the sequence of coordinate points; and a data output unit configured to output information including the coordinates of the decided anchor points and the decided control point coordinates.

11 Claims, 20 Drawing Sheets

(56) References Cited

FOREIGN PATENT DOCUMENTS

| | | |
|---|---|---|
| JP | 2006-031245 A | 2/2006 |
| JP | 2009-071626 A | 4/2009 |

OTHER PUBLICATIONS

Japanese Office Action issued on Feb. 10, 2014 in Japanese Patent Application No. 2010-079438.

* cited by examiner

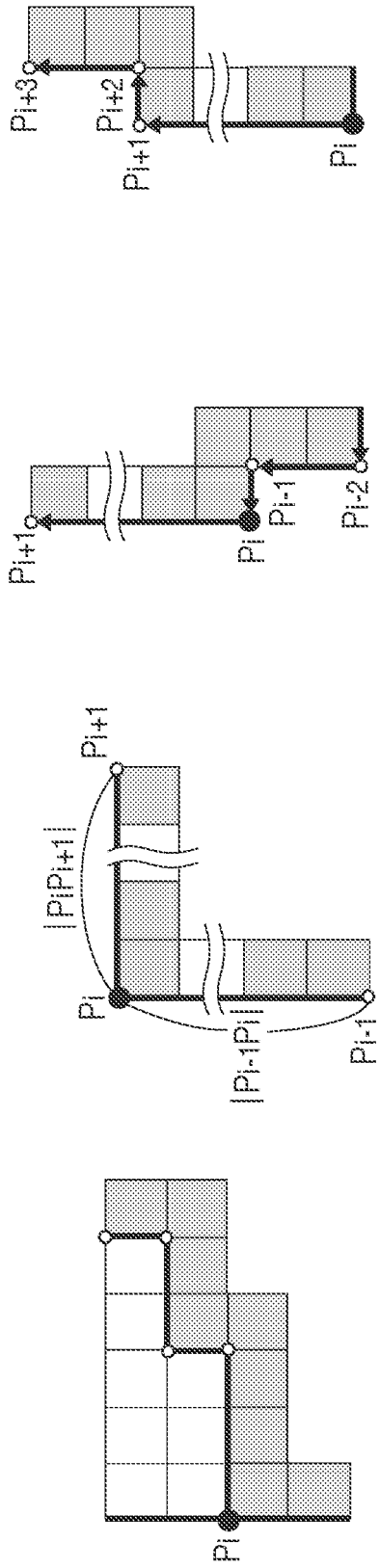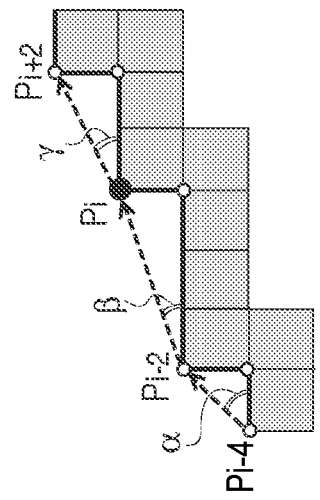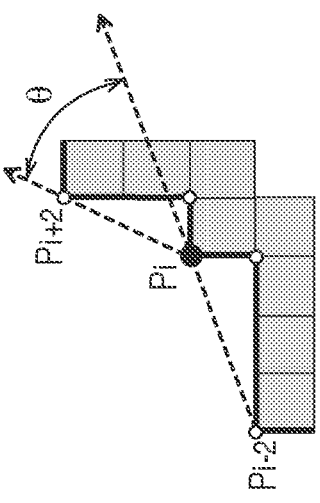
FIG. 13A  FIG. 13B  FIG. 13C  FIG. 13D  FIG. 13E  FIG. 13F  FIG. 13G

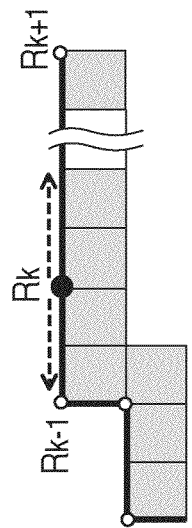
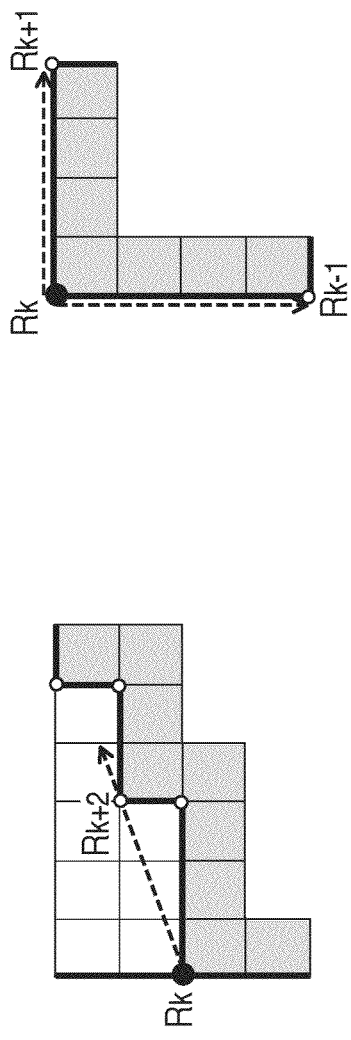
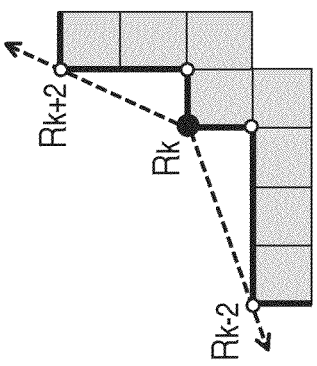
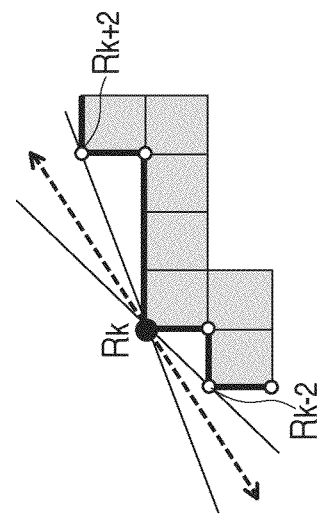
FIG. 18A
FIG. 18B
FIG. 18C
FIG. 18D
FIG. 18E
FIG. 18F

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing technique and, more particularly, to an image processing technique for extracting feature points from a raster image, and converting the raster image into a vector image by executing functional approximation.

2. Description of the Related Art

In recent years, devices such as a display and printer having different resolutions tend to be used together, and cases wherein identical image information is displayed at different resolutions are increasing. When an image suited to a low-resolution device is to be displayed on a high-resolution device, image deterioration stands out since the resolution of the device cannot be utilized. For this reason, a vectorization technique for converting an image expressed in a raster format into a vector format, which is independent of a resolution, is required.

Such vectorization techniques have been conventionally examined. For example, a vectorization method for a binary image is disclosed in Japanese Patent Laid-Open No. 2005-310070. This method divides a contour of a binary image at points which meet the following conditions, and approximates divided sections using Bézier curves.

Angular point 1: a point where a change in vector that connects neighboring point sequences is acute-angled Angular point 2: two corner points when a distance between continuous points is larger than a certain threshold Inflection point: a point where a sign of an outer product of continuous vectors changes As a sequence of coordinate points extraction processing, for example, a method of Japanese Patent No. 3026592 is disclosed. According to this method, inter-pixel vectors in horizontal and vertical directions are detected based on states of a pixel of interest and its neighboring pixels, and connection states of these inter-pixel vectors are discriminated, thereby extracting sequences of coordinate points of image data from the connection states of the inter-pixel vectors. This sequence of coordinate points extraction method can provide a significant width even to a thin line having a 1-pixel width by extracting sequences of coordinate points for respective pixel edges in place of a pixel central position.

A vectorization method which targets not only a binary image but also a line image or illustration image including several colors is disclosed in, for example, Japanese Patent Laid-Open No. 2006-031245. This method can vectorize a color image without generating any gap in principle by a processing sequence for extracting boundary lines common to color regions, and executing functional approximation. A sequence of coordinate points extraction method in this case extracts sequences of coordinate points by tracking lines having colors which have a difference equal to or larger than a threshold between neighboring pixels unlike Japanese Patent No. 3026592. Boundary lines common to color regions are calculated from the extracted sequences of coordinate points, and a common functional approximation result is applied upon outputting the color regions, thus attaining vectorization.

However, the conventional vectorization method defines extraction rules that refer to several sides before and after a point of interest upon extracting anchor points required for functional approximation from a raster image, and uniquely extracts anchor points. However, since a wide variety of sequence of coordinate points patterns are input, the extraction rules are complicated in proportion to the number of sides to be referred to, thus posing the following problems.

- If the extraction rules suffer any consideration errors, for example, when an image shown in FIG. 1A is input, points to be extracted as anchor points often fail to be extracted, as shown in FIG. 1B.
- Since a reduction of anchor points is not taken into consideration, anchor points are excessively extracted, as shown in FIG. 1C, resulting in a large data size.
- In order to improve the precision, the number of extraction rules increases in proportion to the number of sides to be referred to, resulting in complicated processing.

SUMMARY OF THE INVENTION

According to one aspect of the present invention, there is provided an image processing apparatus comprising: an anchor point candidate information extraction unit configured to decide coordinates of anchor point candidates and attributes of the anchor point candidates based on a plurality of predetermined extraction rules and a sequence of coordinate points that expresses an outline of image data; an anchor point decision unit configured to decide an anchor point candidate to be reduced based on the attributes of the anchor point candidates and priority orders set in advance for the attributes, and configured to decide anchor points by reducing the decided anchor point candidates to be reduced; a control point coordinate decision unit configured to decide control point coordinates based on the anchor points decided by the anchor point decision unit and the sequence of coordinate points; and a data output unit configured to output information including the coordinates of the decided anchor points and the decided control point coordinates.

According to another aspect of the present invention, there is provided an image processing method comprising: an anchor point candidate information extraction step of deciding coordinates of anchor point candidates and attributes of the anchor point candidates based on a plurality of predetermined extraction rules and a sequence of coordinate points that expresses an outline of image data; an anchor point decision step of deciding an anchor point candidate to be reduced based on the attributes of the anchor point candidates and priority orders set in advance for the attributes, and deciding anchor points by reducing the decided anchor point candidates to be reduced; a control point coordinate decision step of deciding control point coordinates based on the anchor points decided by the anchor point decision unit and the sequence of coordinate points; and a data output step of outputting information including the coordinates of the decided anchor points and the decided control point coordinates.

According to another aspect of the present invention, there is provided a computer-readable medium storing a program controlling a computer to function as: an anchor point candidate information extraction unit which decides coordinates of anchor point candidates and attributes of the anchor point candidates based on a plurality of predetermined extraction rules and a sequence of coordinate points that expresses an outline of image data; an anchor point decision unit which decides an anchor point candidate to be reduced based on the attributes of the anchor point candidates and priority orders set in advance for the attributes, and decides anchor points by reducing the decided anchor point candidates to be reduced; a control point coordinate decision unit which decides control point coordinates based on the anchor points decided by the anchor point decision unit and the sequence of coordinate points; and a data output unit which outputs information including the coordinates of the decided anchor points and the decided control point coordinates.

The present invention can provide the following effects.

Pattern matching rules can be simplified to allow easy implementation.

Since anchor points are extracted using simple rules, extraction errors can be reduced, thus improving the vectorization precision.

Since neighboring anchor points are compared, and reduction processing is executed in consideration of priority orders, a data size can be reduced while leaving required anchor points.

Further features of the present invention will become apparent from the following description of exemplary embodiments (with reference to the attached drawings).

BRIEF DESCRIPTION OF THE DRAWINGS

FIGS. 13A, 13B, 13C, 13D, 13E, 13F, and 13G are views showing an example of anchor point candidate information extraction rules according to the first embodiment;

FIGS. 18A, 18B, 18C, 18D, 18E, and 18F are views showing an example of tangential directions in the tangential direction decision processing according to the first embodiment;

DESCRIPTION OF THE EMBODIMENTS

First Embodiment

Embodiments of the present invention will be described hereinafter with reference to the accompanying drawings. Note that components are described in these embodiments only for the exemplary purpose, and the technical scope of the present invention is settled by the scope of the claims but it is not limited by the following individual embodiments.

Figures 1A, 1B, 1C:
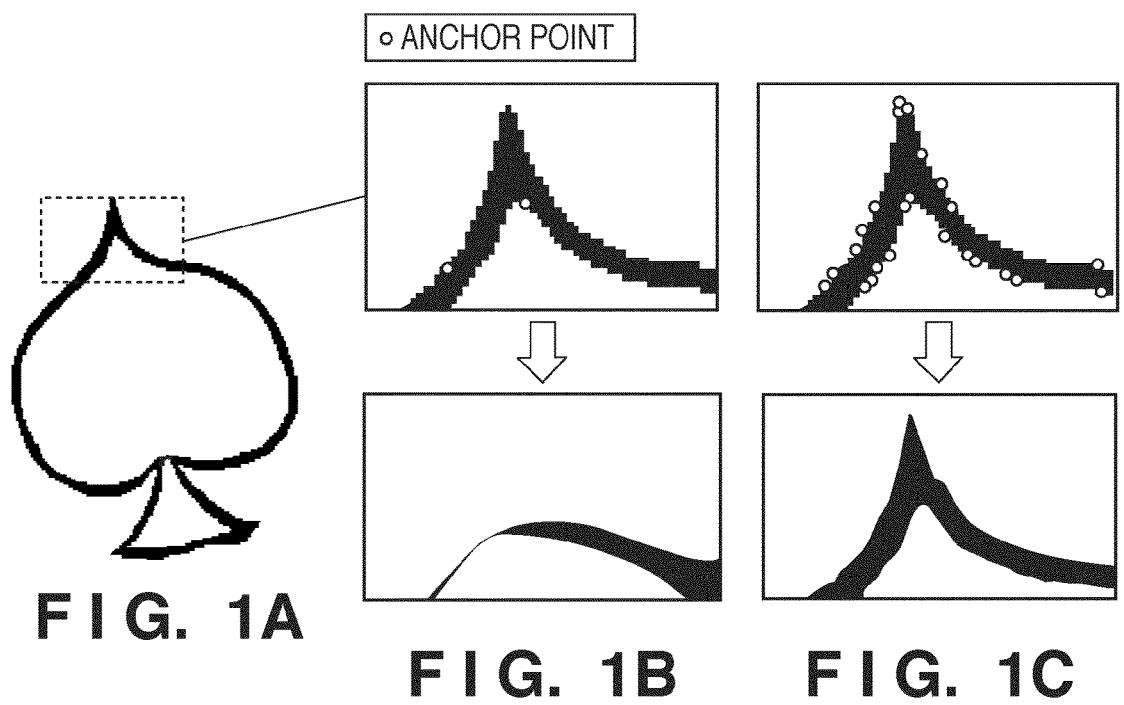
FIGS. 1A, 1B, and 1C show examples of anchor points extraction by a prior art.
Figure 2:
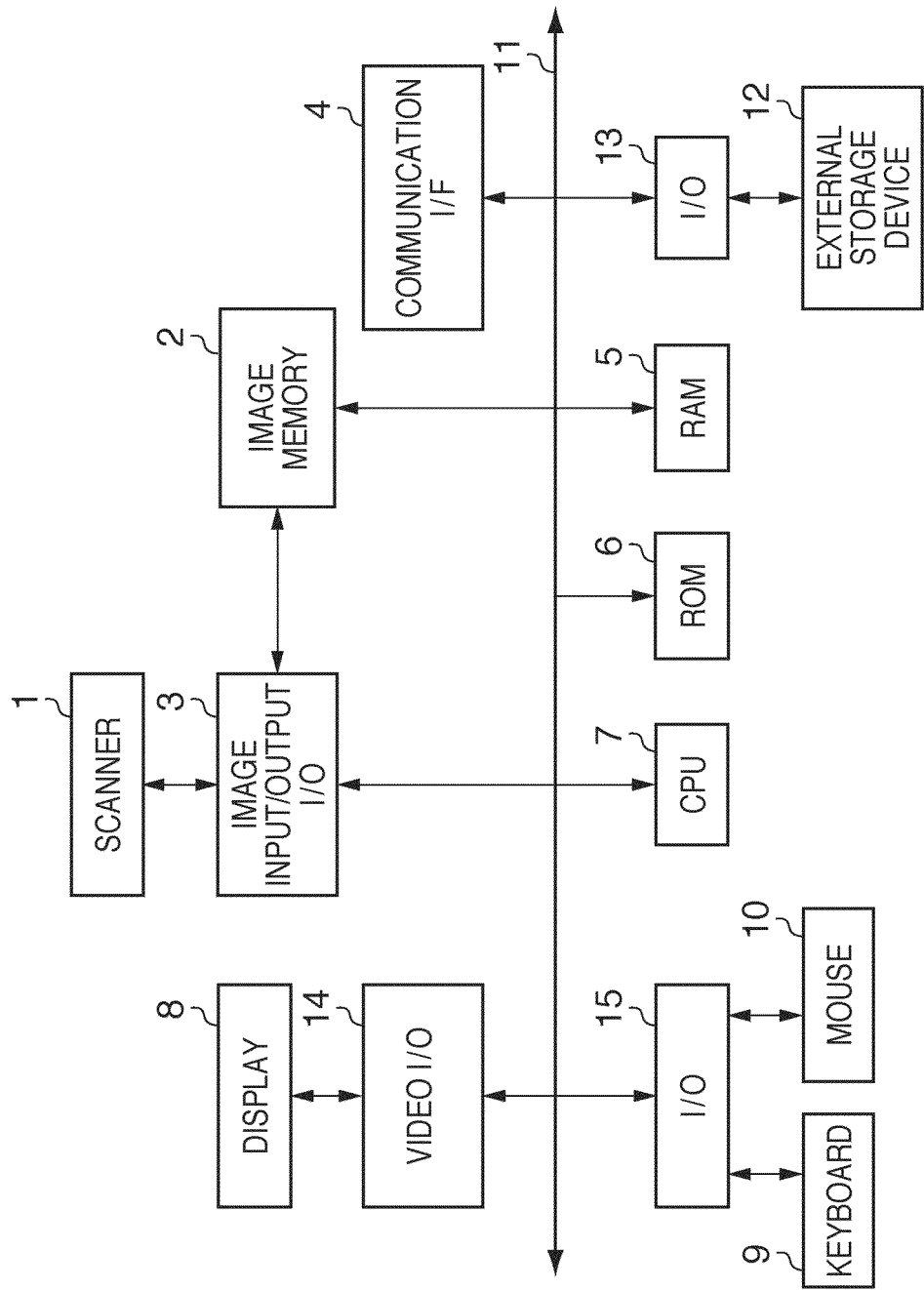
FIG. 2 is a block diagram showing the arrangement of an image processing apparatus.

An example of the arrangement of an image processing apparatus according to this embodiment will be described below with reference to the block diagram of FIG. 2. Referring to FIG. 2, a CPU (Central Processing Unit) 7 controls the overall apparatus. Note that processing sequences to be described hereinafter are executed by the CPU 7 unless otherwise specified. A ROM (Read Only Memory) 6 stores programs and parameters which need not be changed. A RAM (Random Access Memory) 5 temporarily stores programs and data which are supplied from, for example, an external apparatus. A scanner 1 acquires digital image data by photoelectrically scanning, for example, a document, and is connected to the image processing apparatus via an image input/output I/O 3. An image memory 2 holds image data and the like read by the scanner 1. An external storage device 12 includes program storage media such as a fixed hard disk or memory card, or a detachable flexible disk (FD), optical disk including a Compact Disk (CD), magnetic or optical card, IC card, and memory card. An I/O 13 is used to exchange data between such external storage device 12 and a computer apparatus. An I/O 15 exchanges data with input devices such as a pointing device 10 (for example, a mouse) and keyboard 9, which accept user's operation and input data. A video I/O 14 exchanges data with a display monitor 8 used to display data held by the image processing apparatus and supplied data. A communication I/F 4 is an interface used to connect to a network line such as the Internet. A system bus 11 connects the aforementioned units to be able to communicate with each other.

[Processing Sequence]

Figure 3:
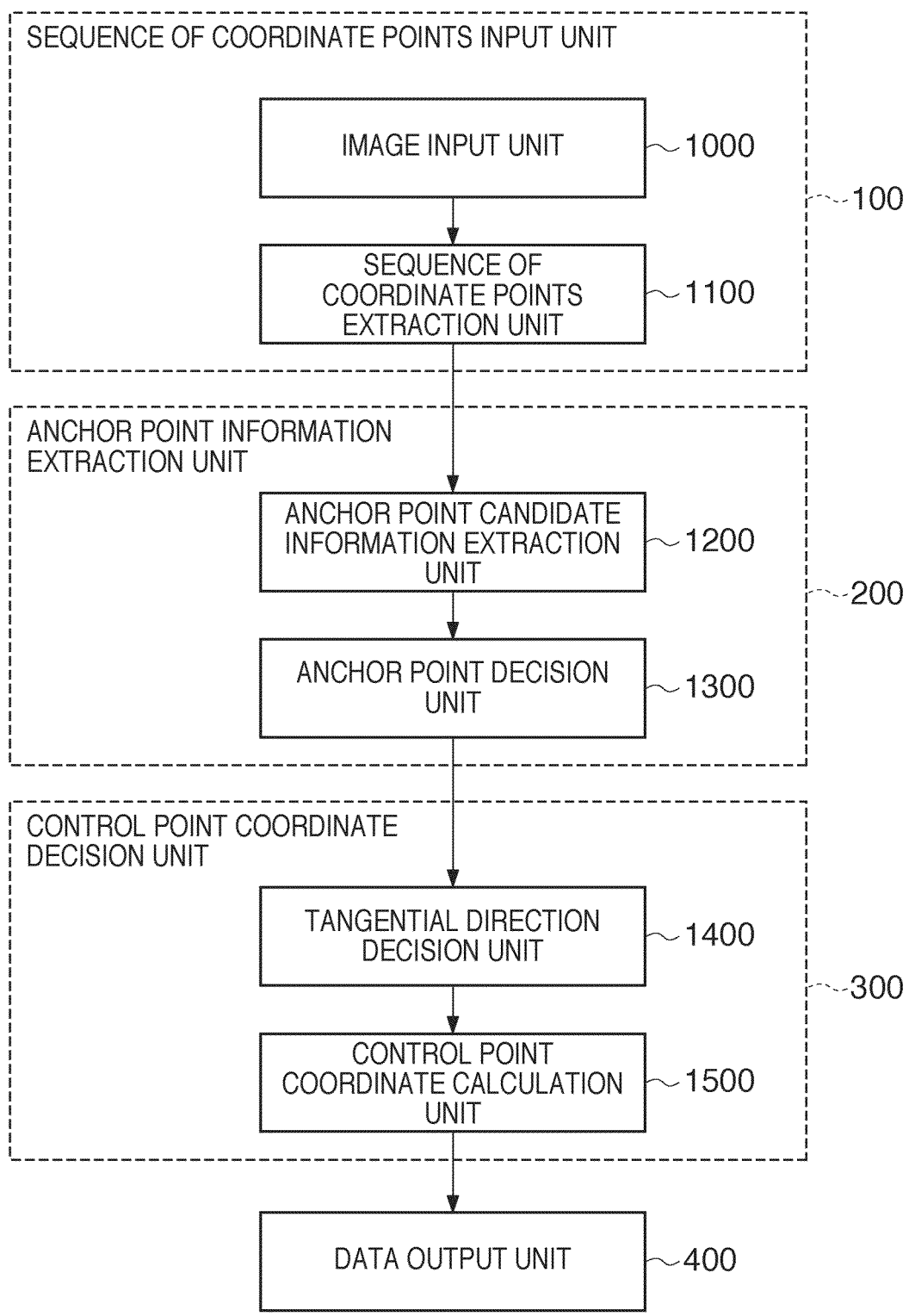
FIG. 3 is a block diagram showing the arrangement of main processing of the image processing apparatus.

The processing sequence which implements the present invention by programs executed on the CPU 7 will be described below using the block diagram of FIG. 3 and the flowchart of FIG. 4.

Figure 4:
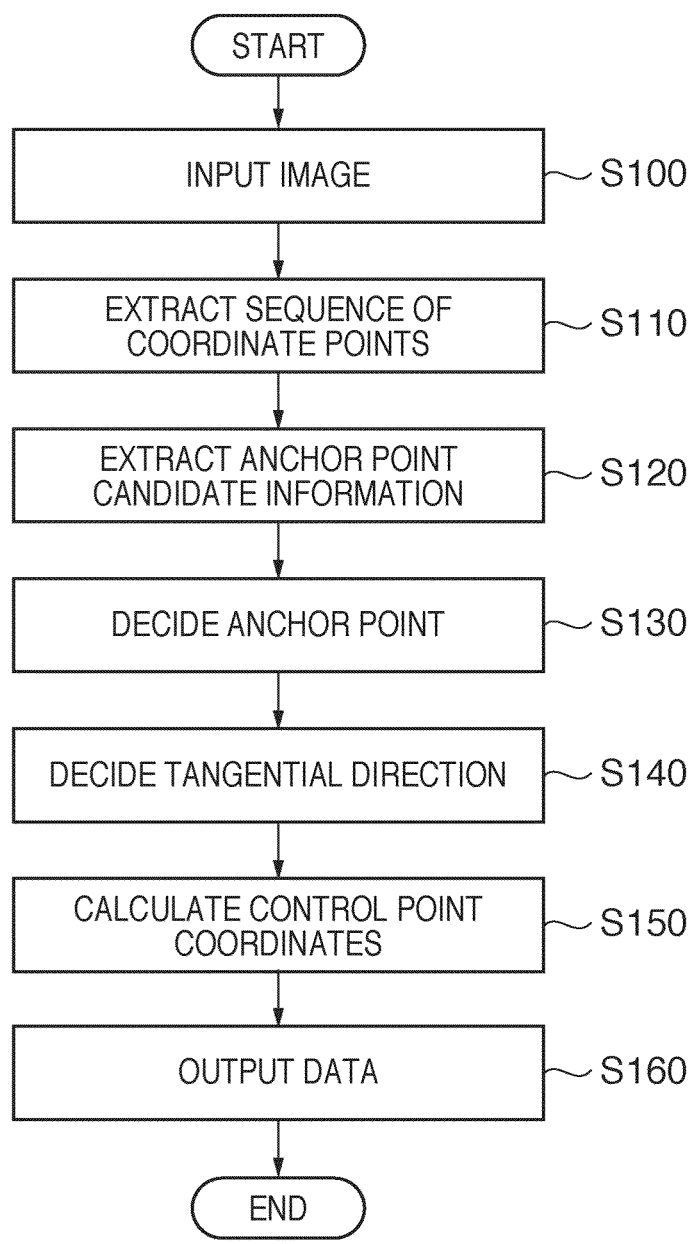
FIG. 4 is a flowchart showing the main processing of the image processing apparatus according to the first embodiment.

In the flowchart of FIG. 4, when the processing starts, the CPU 7 inputs image data including image regions to be processed in step S100. As for an image to be input, image data read by the scanner 1 is input to the image memory 2 via the image input/output I/O 3. Alternatively, an image including image regions to be processed may be input from an external apparatus via the communication I/F 4, or image data, which is pre-stored in the external storage device 12, may be loaded via the I/O 13. The obtained input image data is held on the image memory 2. The aforementioned processing implements an image input unit 1000 shown in FIG. 3.

Figure 5:
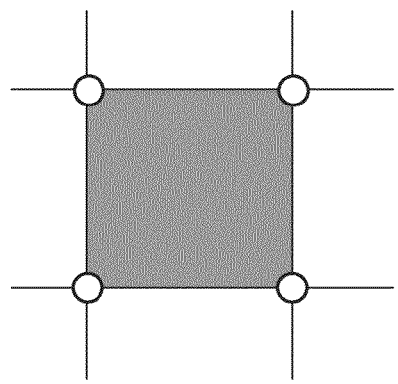
FIG. 5 is a view showing one pixel in a binary image and coordinate points generated from that pixel.
Figure 6A:
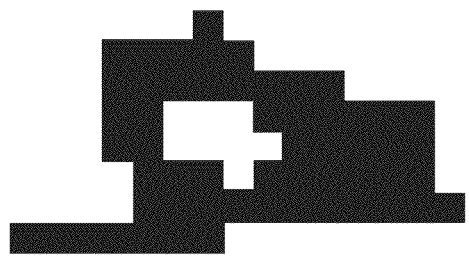
FIGS. 6A and 6B are views showing a binary image and an example of sequences of coordinate points generated from the binary image.
Figure 6B:
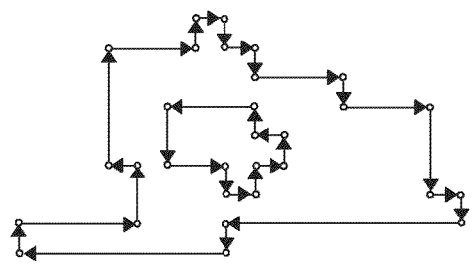

In step S110, the CPU 7 applies sequence of coordinate points extraction processing to the read image data. FIG. 5 shows one black pixel included in the image data to be handled in this embodiment. As shown in FIG. 5, one pixel in the image data is handled as a square which has four vertices, and is configured by a vertical vector indicating a vertical direction and a horizontal vector indicating a horizontal direction. When one pixel is handled as a square having four vertices, and an outline of image data as a set of a plurality of pixels is extracted, a sequence of coordinate points including vertical and horizontal vectors is obtained as outline data. Various extraction methods of such sequence of coordinate points have been proposed. Especially, when the sequence of coordinate points extraction method disclosed in Japanese Patent No. 3026592 is used, a sequence of coordinate points can be efficiently and quickly extracted from one image plane. For example, sequences of coordinate points extracted from an image shown in FIG. 6A have a configuration in which horizontal and vertical vectors are alternately connected, as shown in FIG. 6B. That is, a coordinate point indicates a point where a direction of a horizontal or vertical vector changes.

Figure 7A:
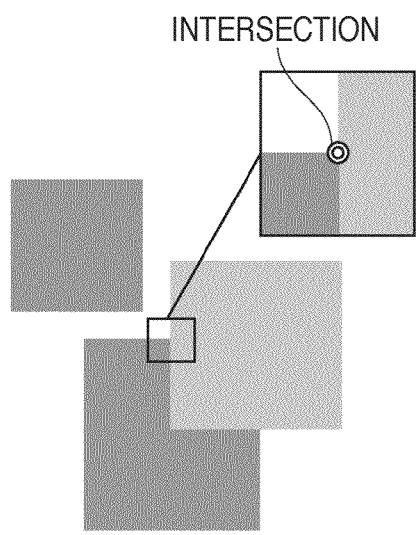
FIGS. 7A and 7B are views showing a multi-valued image and an example of sequences of coordinate points generated from the multi-valued image.
Figure 7B:
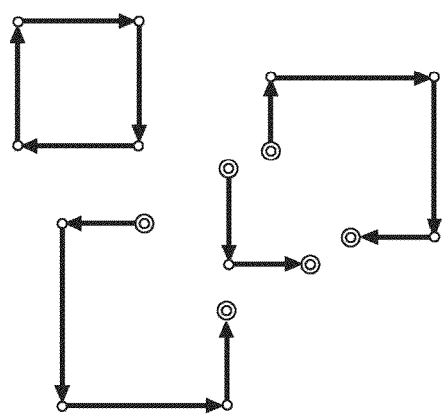

At this time, when the read image data includes a plurality of colors, a sequence of coordinate points tracking method described in Japanese Patent Laid-Open No. 2006-031245 can be applied. That is, as shown in FIG. 7A, in this method, if there is an intersection of color regions of three or more colors, sequences of coordinate points are divided at the intersection to extract different sequences of coordinate points, as shown in FIG. 7B. FIG. 7B shows an example of a case in which four sequences of coordinate points are obtained. In this embodiment, as a result of tracking of a sequence of coordinate points, a sequence of coordinate points whose start and end points have identical coordinates is called a closed contour, and a sequence of coordinate points whose start and end points have different coordinates is called an open contour. The aforementioned processing implements a sequence of coordinate points extraction unit 1100 shown in FIG. 3. Steps S100 and S110 implement a sequence of coordinate points input unit 100 in FIG. 3 in combination.

In steps S120, S130, S140, and S150, the CPU 7 applies functional approximation processing to the extracted sequences of coordinate points. This embodiment uses a cubic Bézier curve as a function to be replaced. The cubic Bézier curve is configured by two anchor points and two control points, as shown in FIG. 8, and is defined by:

$$r(t)=(1-t)^3 a_1 + 3t(1-t)^2 c_1 + 3t^2(1-t)c_2 + t^3 a_2$$

Figure 8:
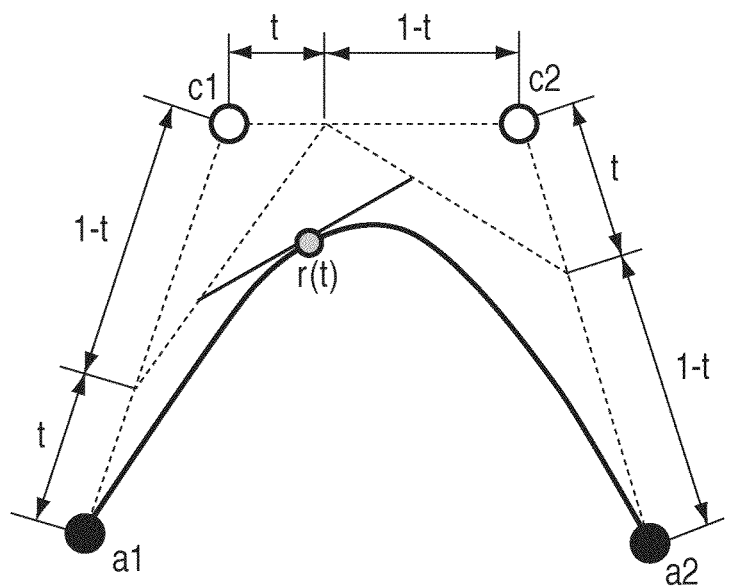
FIG. 8 is a view showing the concept of a Bézier curve.

At this time, in FIG. 8, full dots respectively indicate anchor points a1 and a2, and open dots respectively indicate control points c1 and c2. Also, t is a parameter and $0 \leq t \leq 1$. Hence, in order to attain functional approximation using a cubic Bézier curve, it is required to decide anchor points which appropriately partition each sequence of coordinate points obtained in step S110 and to decide control points which appropriately approximate a shape of the sequence of coordinate points that configures sections between these anchor points. The sequence of the functional approximation processing according to this embodiment will be described below.

Figure 9:
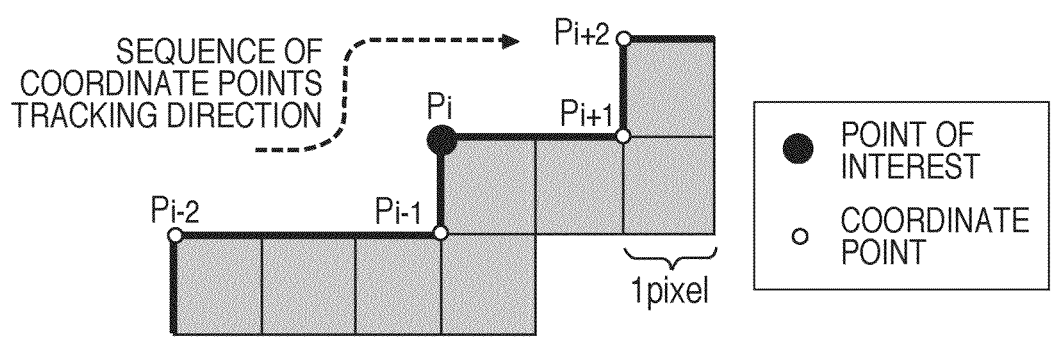
FIG. 9 is a view showing a point of interest and surrounding coordinate points.

In step S120, the CPU 7 executes anchor point candidate information extraction processing. In this step, when a pattern formed by a point of interest in the sequence of coordinate points extracted in step S110 and its neighboring coordinate points matches a pattern specified by a plurality of predetermined extraction rules, the point of interest is decided as an anchor point candidate, and anchor point candidate information is output. In step S120, as shown in FIG. 9, let $P_i$ (i=1, 2, ..., n) be a current point of interest of the sequence of coordinate points, $P_{i-1}$, $P_{i-2}$, ... be coordinate points in a reverse direction of the sequence of coordinate points tracking direction when viewed from the point $P_i$ of interest, and $P_{i+1}$, $P_{i+2}$, ... be coordinate points in a forward direction of the sequence of coordinate points tracking direction. Also, the anchor point candidate information indicates coordinates extracted as an anchor point candidate, and an attribute type indicating pattern characteristics in the neighborhood of the point $P_i$ of interest.

Figure 10:
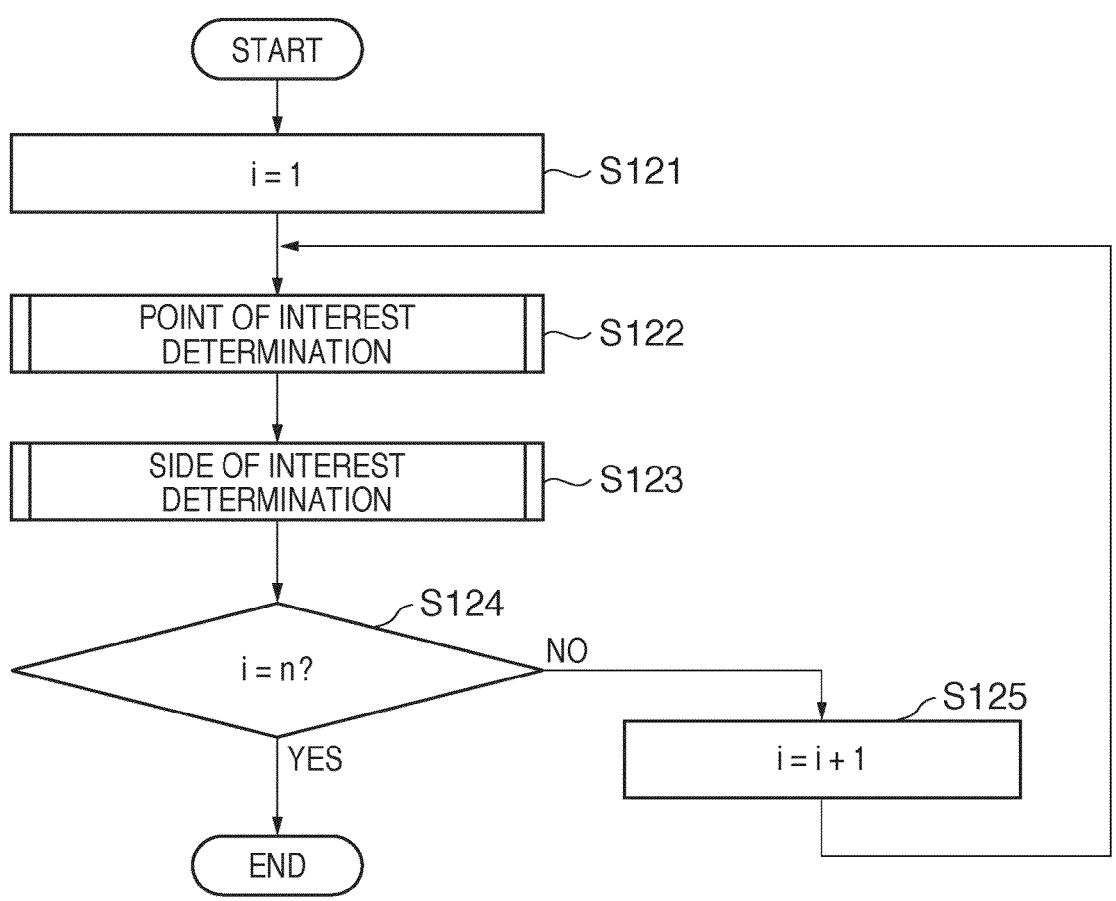
FIG. 10 is a flowchart showing anchor point candidate information extraction processing according to the first embodiment.

FIG. 10 is a flowchart showing the sequence of the anchor point candidate information extraction processing executed by the CPU 7 in step S120. In step S121, the CPU 7 sets an initial point of the sequence of coordinate points to be tracked, and selects that coordinate point as a point of interest. Next, the CPU 7 determines in step S122 whether or not the point $P_i$ of interest itself is selected as an anchor point candidate.

Note that in the present invention, determinations are made using a plurality of thresholds, and thresholds may be derived empirically or may be decided based on, for example, predetermined formulas. Some determination conditions require that a value is to be equal to or larger than a threshold or it is to be equal to or smaller than a threshold, but they may be adjusted according to characteristics of thresholds to be set or as needed (for example, "smaller than a threshold").

[Point of Interest Determination Processing]

Figure 11:
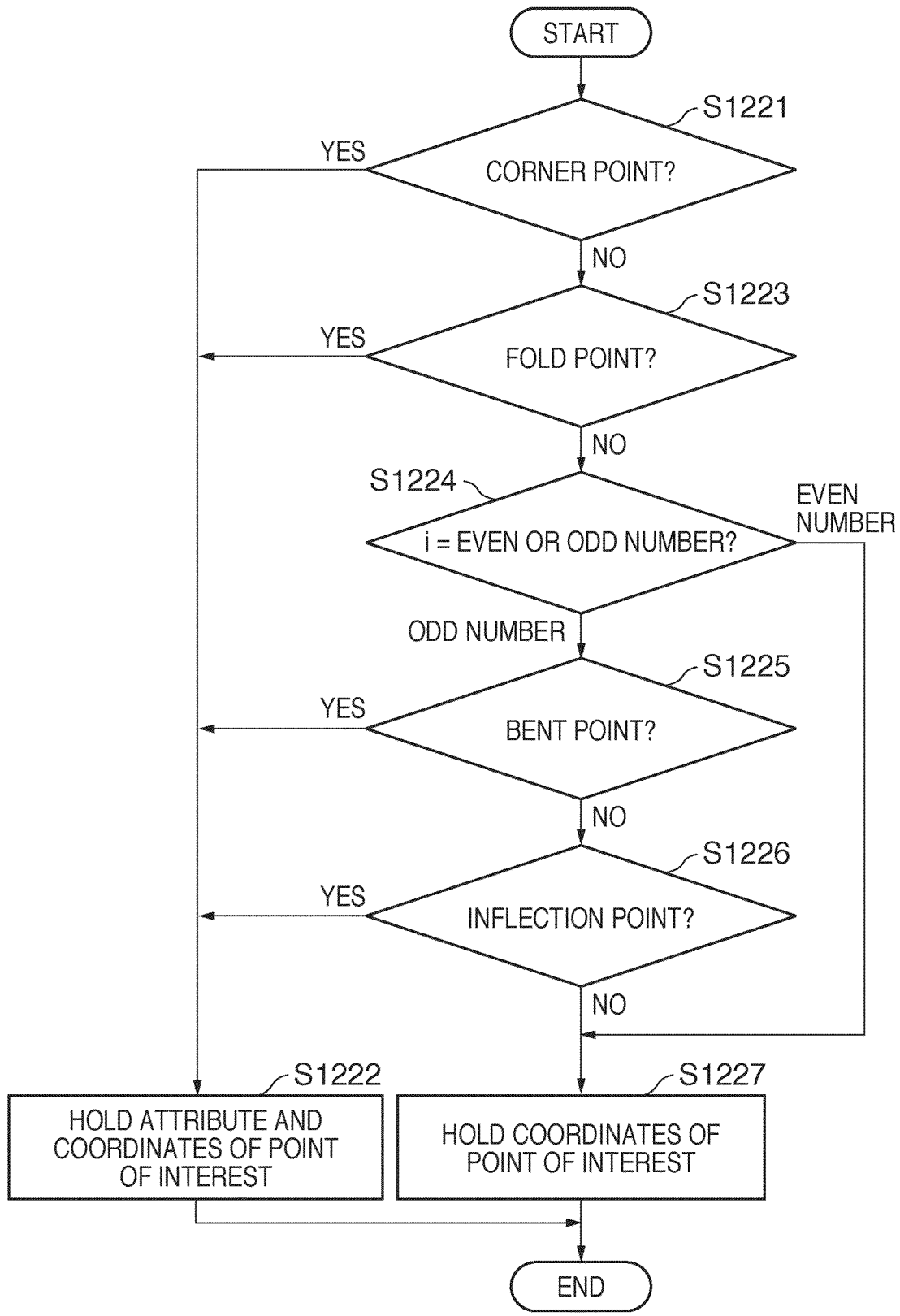
FIG. 11 is a flowchart showing anchor point candidate determination processing according to the first embodiment.

FIG. 11 is a flowchart showing the detailed sequence of the point of interest determination processing executed by the CPU 7. The CPU 7 determines in step S1221 whether or not the point of interest is a corner point. The corner point is a point before or after which there is no coordinate point like a coordinate point $P_i$ of interest of an open contour, as shown in FIG. 13A. If it is determined that the point of interest is a corner point, the process advances to step S1222 to hold the coordinates of the point $P_i$ of interest itself and an attribute "corner point", thus ending the processing.

If it is determined in step S1221 that the point of interest is not a corner point, the process advances to step S1223 to determine whether or not the point of interest is a fold point. Assume that the fold point is defined when coordinates $P_{i-1}$ and $P_{i+1}$ are set as reference points and both lengths of sides $P_{i-1}P_i$ and $P_iP_{i+1}$ respectively formed by the point $P_i$ of interest and the reference points $P_{i-1}$ and $P_{i+1}$ are equal to or larger than a threshold T1, as shown in FIG. 13B. Also, assume that the directions of the sides $P_{i-1}P_i$ and $P_iP_{i+1}$ change from the horizontal direction to the vertical direction or vice versa. The length of the side in this case indicates pixel lengths included between the coordinates. At this time, the threshold T1 may be uniquely set or may be variable in consideration of an image size. In this embodiment, letting C be a length of an outer circumference of a circumscribed rectangle of the sequence of coordinate points, the threshold T1=2+C/300. However, the threshold T1 is limited to a range of $2 \leq T1 \leq 6$. If it is determined that the point of interest is a fold point, the process advances to step S1222 to hold the coordinates of the point $P_i$ of interest itself and an attribute "fold point", thus ending the processing.

If it is determined in step S1223 that the point of interest is not a fold point, the process advances to step S1224. The CPU 7 determines in step S1224 whether the current coordinate point of interest is an odd- or even-numbered point counted from a corner point. That is, the CPU 7 determines whether i is an even or odd number. If it is determined that the point of interest is an even-numbered point, the process jumps to step S1227 to hold only the coordinates of the point $P_i$ of interest itself, thus ending the processing. If it is determined that the point of interest is an odd-numbered point, the process advances to step S1225.

The CPU 7 determines in step S1225 whether or not the point of interest is a bent point. Assume that the bent point is defined when coordinates $P_{i-2}$ and $P_{i+2}$ are set as reference points, an angle θ line segments $P_{i-2}P_i$ and $P_iP_{i+2}$ make is calculated, and the angle θ is equal to or larger than a threshold T2, as shown in FIG. 13F. In this embodiment, the threshold T2=25°. If it is determined that the point of interest is a bent point, the process advances to step S1222 to hold the coordinates of the point $P_i$ of interest itself and an attribute "bent point", thus ending the processing.

If it is determined in step S1225 that the point of interest is not a bent point, the process advances to step S1226 to determine whether or not the point of interest is an inflection point. Assume that the inflection point is defined as follows. That is, coordinates $P_{i-4}$, $P_{i-2}$, and $P_{i+2}$ are set as reference points, and an inclination α of a line segment $P_{i-4}P_{i-2}$, an inclination β of a line segment $P_{i-2}P_i$, and an inclination γ of a line segment $P_iP_{i+2}$ are calculated, as shown in FIG. 13G. Then, inclination change amounts β−α and γ−β are calculated, and a point where the signs of the inclination change amounts are switched is defined as an inflection point. That is, a point where the signs of outer products change between continuous vectors in the inclination change amounts is defined as the inflection point. However, when an absolute value of the inclination change amount β−α is equal to or smaller than a threshold T3, the determination is repeated while tracing back a line segment which assumes the inclination α to $P_{i-6}P_{i-4}$, $P_{i-8}P_{i-6}$, . . . until the absolute value of β−α assumes a value equal to or larger than the threshold T3. In this embodiment, the threshold T3=1.0×10$^{-7}$. If it is determined that the point of interest is an inflection point, the process advances to step S1222 to hold the coordinates of the point $P_i$ of interest itself and an attribute "inflection point", thus ending the processing. If it is determined in step S1226 that the point of interest is not an inflection point, the process advances to step S1227 to hold only the coordinates of the point $P_i$ of interest itself, thus ending the processing.

[Side of Interest Determination Processing]

Figure 12:
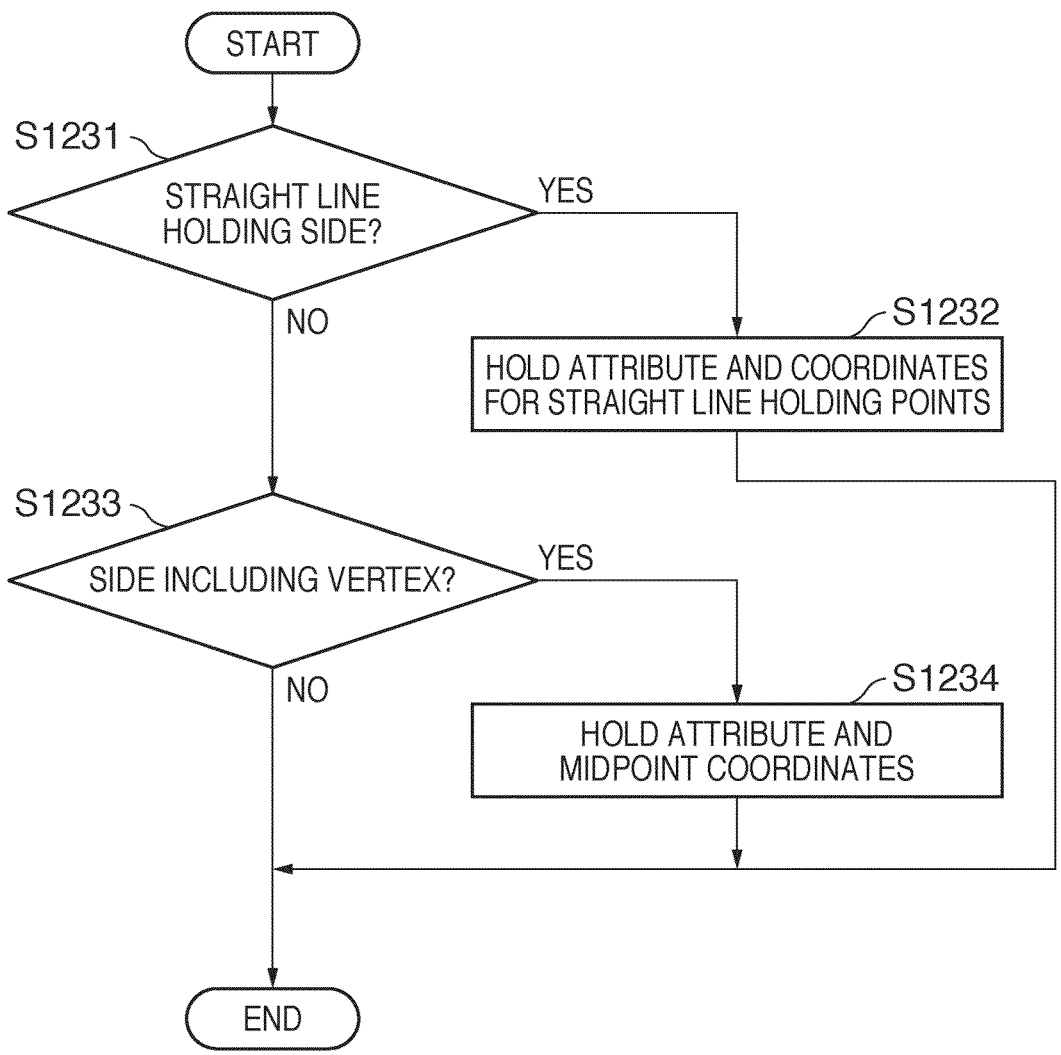
FIG. 12 is a flowchart showing anchor point candidate determination processing according to the first embodiment.

The anchor point candidate determination processing of the point $P_i$ of interest itself in step S122 is complete by the processing executed so far. Next, the process advances to step S123 to determine whether or not an anchor point candidate is to be set on a side $P_iP_{i+1}$ of interest. The side of interest indicates a side which connects the point $P_i$ of interest and a next coordinate point $P_{i+1}$. In this case, when the anchor point candidate is extracted, since the coordinates of the anchor point candidate are located on the side of interest, the coordinates are added between the sequence of coordinate points $P_iP_{i+1}$ extracted in step S110. FIG. 12 is a flowchart of the detailed processing.

The CPU 7 determines in step S1231 whether or not the side $P_iP_{i+1}$ of interest is a straight line holding side. Assume that the straight line holding side is defined as follows. That is, in order to determine the straight line holding side, coordinates $P_{i-2}$, $P_{i-1}$, and $P_{i+1}$ or coordinates $P_{i+1}$, $P_{i+2}$, and $P_{i+3}$ are set as reference points, as shown in FIG. 13C or 13D. Then, lengths $|P_{i-2}P_{i-1}|$ and $|P_iP_{i+1}|$ of vectors $P_{i-2}P_{i-1}$ and $P_iP_{i+1}$ or lengths $|P_iP_{i+1}|$ and $|P_{i+2}P_{i+3}|$ of vectors $P_iP_{i+1}$ and $P_{i+2}P_{i+3}$ are respectively calculated. A side in which $|P_iP_{i+1}|$ is equal to or larger than $|P_{i-2}P_{i-1}|$×threshold T4 or $|P_iP_{i+1}|$ is equal to or larger than $|P_{i+2}P_{i+3}|$×threshold T4, and both vector directions agree with each other is defined as a straight line holding side. That is, the straight line holding side has a length larger than that of a neighboring side by a constant value or more. If it is determined that the side of interest is a straight line holding side, the process advances to step S1232. Then, letting T5 be a threshold, two points located at positions respectively separated from the coordinates $P_i$ and $P_{i+1}$ by a distance $|P_iP_{i+1}|$/T5 on the side $P_iP_{i+1}$ of interest are decided, and are held to have an attribute "straight line holding point", thus ending the processing. At this time, the thresholds T4 and T5 may be uniquely set as predetermined values, or may be variable in consideration of an image size. In this embodiment, the threshold T4=10, and the threshold T5=5.

If it is determined in step S1231 that the side $P_iP_{i+1}$ of interest is not a straight line holding side, the process advances to step S1233 to determine whether or not the side of interest is a side including a vertex. Assume that the side including a vertex is defined when coordinates $P_{i-1}$, $P_{i+1}$, and $P_{i+2}$ are set as reference points, and directions of vectors and $P_{i-1}P_i$ and $P_{i+1}P_{i+2}$ are opposite to each other, as shown in FIG. 13E. That is, in this example, the side $P_iP_{i+1}$ of interest is a side including a vertex. If it is determined that the side $P_iP_{i+1}$ of interest is a side including a vertex, the process advances to step S1234 to hold midpoint coordinates of the line segment $P_iP_{i+1}$ and an attribute "vertex", thus ending the processing. If it is determined in step S1233 that the side $P_iP_{i+1}$ of interest is not a side including a vertex, the processing ends.

The anchor point candidate determination processing of the side $P_iP_{i+1}$ of interest in step S123 is complete by the processing executed so far. Next, the CPU 7 determines in step S124 whether or not the current point of interest is an end point of the tracked sequence of coordinate points. That is, the CPU 7 determines whether or not the anchor point candidate determination processing is complete for all coordinate points. If it is determined that the point of interest is not an end point, the CPU 7 selects the next coordinate point on the sequence of coordinate points as a point of interest in step S125, and the process returns to step S122. If it is determined that the point of interest is an end point, the anchor point candidate information extraction processing ends. The aforementioned processing implements an anchor point candidate information extraction unit 1200 shown in FIG. 3.

[Anchor Point Decision Processing]

The CPU 7 executes anchor point decision processing based on the extracted anchor point candidate information in step S130. In this case, let $Q_j$ (j=1, 2, . . . , m) be a sequence of coordinate points extracted as anchor point candidates in step S120. Then, neighboring coordinate points $Q_{j-2}$, $Q_{j-1}$, $Q_{j+1}$, and $Q_{j+2}$ before and after a point $Q_j$ of interest are set as reference points. When these reference points include two or more anchor point candidates extracted in step S120, it is decided whether or not these anchor point candidates are to be reduced according to their attributes. In this case, "reduction" indicates that an attribute of coordinates extracted as an anchor point candidate is deleted to restore the coordinate point to a non-anchor point candidate state in step S120. However, since the coordinate points having the attributes "vertex" and "straight line holding point" are those which are newly added points on the side in step S120, if they are to be reduced, not only the attributes but also the coordinates are reduced so as to restore the state of the sequence of coordinate points extracted in step S110.

Figure 14:
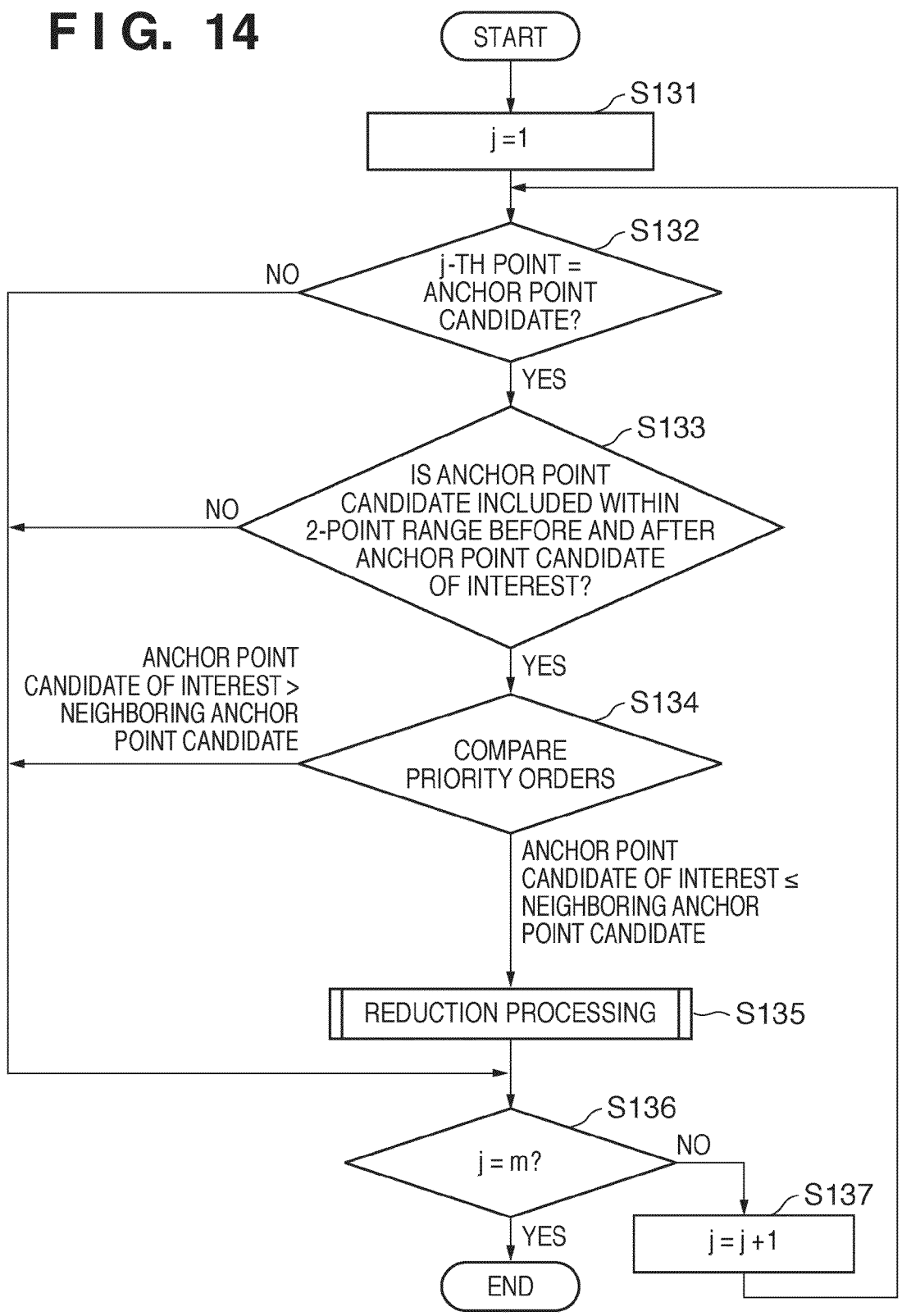
FIG. 14 is a flowchart showing anchor point decision processing according to the first embodiment.

FIG. 14 is a flowchart showing the detailed sequence of the anchor point decision processing executed by the CPU 7 in step S130. In step S131, the CPU 7 sets an initial point of the sequence of coordinate points to be tracked, and selects that coordinate point as a point $Q_j$ of interest. The process then advances to step S132. The CPU 7 determines in step S132 if the point $Q_j$ of interest is a point extracted as an anchor point candidate. If the point $Q_j$ of interest is not a point extracted as an anchor point candidate, the process jumps to step S136. If the point $Q_j$ of interest is a point extracted as an anchor point candidate, the process advances to step S133. In step S133, the CPU 7 sets neighboring coordinate points ($Q_{j-2}$, $Q_{j-1}$, $Q_{j+1}$, and $Q_{j+2}$) which fall within a 2-point range before and after the anchor point candidate $Q_j$ of interest as reference point, and determines whether or not the reference points include an anchor point candidate. If the reference points do not include any anchor point candidate, the process jumps to step S136. If the reference points include an anchor point candidate, the process advances to step S134.

In step S134, the CPU 7 compares the priority orders of anchor point candidates. In this case, the priority order of an anchor point candidate depends on an attribute in the anchor point candidate information. In this embodiment, the priority orders of anchor point candidates are defined in advance like that "fold point", "straight line holding point", "vertex", "bent point", and "inflection point" in descending order. Since a point having the attribute "corner point" is required in a process for joining respective sequences of coordinate points, it is excluded from a reduction target by way of exception. If the priority order of the anchor point candidate $Q_j$ of interest is higher than that of an anchor point candidate included in the reference point, the process jumps to step S136. If the priority order of the anchor point candidate $Q_j$ of interest is equal to or lower than that of an anchor point candidate included in the reference points, the process advances to step S135.

[Reduction Processing]

Figure 15:
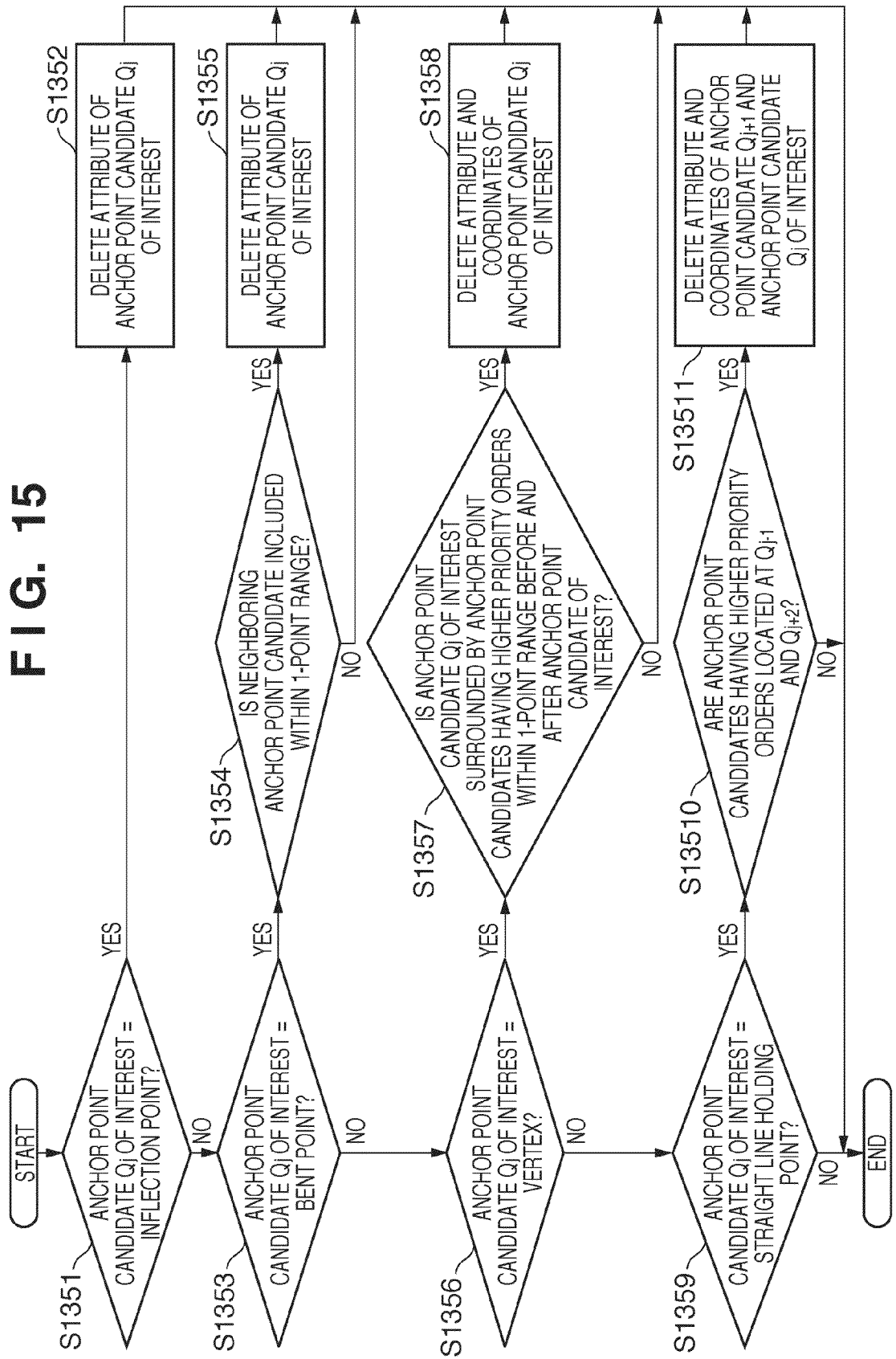
FIG. 15 is a flowchart showing reduction processing according to the first embodiment.

In step S135, the CPU 7 executes anchor point candidate reduction processing. That is, the CPU 7 deletes an attribute of an anchor point candidate to reduce a coordinate point as the anchor point candidate. FIG. 15 is a flowchart showing the detailed sequence of the reduction processing executed by the CPU 7. The CPU 7 determines in step S1351 whether or not the attribute of the anchor point candidate $Q_j$ of interest is "inflection point". If the attribute of the anchor point candidate $Q_j$ of interest is "inflection point", the process advances to step S1352 to delete the attribute of the anchor point candidate $Q_j$ of interest, thus ending the processing. If the attribute of the anchor point candidate $Q_j$ of interest is not "inflection point", the process advances to step S1353. The CPU 7 determines in step S1353 whether or not the attribute of the anchor point candidate $Q_j$ of interest is "bent point". If the attribute of the anchor point candidate $Q_j$ of interest is "bent point", the process advances to step S1354, and the CPU 7 determines whether or not the anchor point candidate included in the reference points is the reference point $Q_{j-1}$ or $Q_{j+1}$ which neighbors the anchor point candidate $Q_j$ of interest. If the reference point $Q_{j-1}$ or $Q_{j+1}$ is an anchor point candidate, the process advances to step S1355 to delete the attribute of the anchor point candidate $Q_j$ of interest, thus ending the processing. If the anchor point candidate is a non-neighboring coordinate point, the processing ends. If it is determined in step S1353 that the attribute of the anchor point candidate $Q_j$ of interest is not "bent point", the process advances to step S1356.

The CPU 7 determines in step S1356 whether or not the attribute of the anchor point candidate $Q_j$ of interest is "vertex". If the attribute of the anchor point candidate $Q_j$ of interest is "vertex", the process advances to step S1357, and the CPU 7 determines whether or not anchor point candidates having attributes whose priority orders are higher than the anchor point candidate of interest are included in both the reference points $Q_{j-1}$ and $Q_{j+1}$ which neighbor the anchor point candidate $Q_j$ of interest. If both the reference points $Q_{j-1}$ and $Q_{j+1}$ include anchor point candidates having attributes whose priority orders are higher than the anchor point candidate $Q_j$ of interest, the process advances to step S1358 to delete the attribute and coordinates of the anchor point candidate $Q_j$ of interest, thus ending the processing. If neither of the neighboring reference points $Q_{j-1}$ and $Q_{j+1}$ include anchor point candidates, the processing ends.

If it is determined in step S1356 that the attribute of the anchor point candidate $Q_j$ of interest is not "vertex", the process advances to step S1359. The CPU 7 determines in step S1359 whether or not the attribute of the anchor point candidate $Q_j$ of interest is "straight line holding point". If the attribute of the anchor point candidate $Q_j$ of interest is "straight line holding point", the reference point $Q_{j+1}$ surely has the same attribute "straight line holding point". Hence, the process then advances to step S13510, and the CPU 7 determines whether or not both the reference points $Q_{j-1}$ and $Q_{j+2}$ include anchor point candidates having attributes whose priority orders are higher than the anchor point candidate of interest. If both the reference points $Q_{j-1}$ and $Q_{j+2}$ include anchor point candidates having attributes whose priority orders are higher than the anchor point candidate of interest, the process advances to step S13511 to delete the attribute and coordinates of an anchor point candidate included in the reference point $Q_{j+1}$ and the anchor point candidate $Q_j$ of interest, thus ending the processing. If neither of the reference points $Q_{j-1}$ and $Q_{j+2}$ include anchor point candidates, the processing ends. If the attribute of the anchor point candidate $Q_j$ of interest is not "straight line holding point", the processing ends.

The determination processing as to whether or not to delete the anchor point candidate of interest is complete by the processing execute so far. Next, the CPU 7 determines in step S136 if the current point of interest is an end point of the tracked sequence of coordinate points. That is, the CPU 7 determines whether or not this processing is applied to all the anchor point candidates. If it is determined that the point of interest is not an end point, the CPU 7 selects the next anchor point candidate on the sequence of coordinate points as an anchor point candidate of interest in step S137, and the process returns to step S132. If it is determined that the current anchor point candidate of interest is an end point, the anchor point decision processing ends. The aforementioned processing implements an anchor point decision unit 1300 in FIG. 3. Also, steps S120 and S130 implement an anchor point information extraction unit 200 in combination.

[Purpose and Priority Order of Anchor Point Candidate Attribute]

The reasons for the purposes and priority orders of the respective anchor point candidate attributes will be described below. The attribute "corner point" indicates a start corner and end corner of an open contour, and sequences of coordinate points are joined with reference to this point after the approximation processing, as described above. Hence, this attribute is never reduced, and is excluded from a priority order comparison target.

The attribute "fold point" has a purpose of expressing an angulated portion in the sequence of coordinate points of the input image. A point having the attribute "fold point" is a characteristic point in the image, and a visual change due to reduction of this attribute is large in every patterns. For this reason, the attribute "fold point" has the first priority order of anchor point candidates, and is never reduced.

The attribute "straight line holding point" has a purpose of expressing a straight line portion in an x or y direction in the sequence of coordinate points of the input image. For this reason, two neighboring points are inevitably extracted as those having the attribute "straight line holding point". When this point is reduced, since a straight line may be changed to a curve, a visual change is large. However, if nearest points having the attribute "fold point" exist to surround two points having the attribute "straight line holding point", no visual deterioration takes place if the attribute "straight line holding point" is reduced owing to the purpose of the attribute "fold point". For this reason, this attribute has the second priority order of an anchor point candidate in all the attributes.

The attribute "vertex" has a purpose of expressing an edge or an extremal point of a curve in the sequence of coordinate points of the input image. For this reason, upon reducing a point having the attribute "vertex", a large visual change takes place. However, when nearest points having the attributes "fold point" and "straight line holding point" exist to surround a point having the attribute "vertex", no visual deterioration takes place if the attribute "vertex" is reduced. For this reason, this attribute has the third priority order of an anchor point candidate in all the attributes.

The attribute "bent point" has a purpose of expressing an acute angle change in the sequence of coordinate points of the input image. However, since the bent point extraction determination processing of this embodiment is executed with reference to only angles before and after a point of interest, that attribute is excessively extracted if the input image includes irregular patterns. Also, since a point corresponding to a large angle change in the image is extracted, the influence when that point is reduced is large. However, when this attribute exists at a position nearest to a representative characteristic portion such as "vertex" or "bent point" of the image, an image change is obscure even when it is reduced. For this reason, this attribute has the fourth priority order of an anchor point candidate in all the attributes.

Finally, the attribute "inflection point" has a purpose of eliminating approximate sections of complicated patterns by partitioning approximate sections at a point where inclination change amounts are switched in the sequence of coordinate points of the input image. However, since the inflection point extraction determination processing of this embodiment is executed with reference to only a local region, this attribute is excessively extracted if the input image includes irregular patterns. Also, since an inflection point exists in the middle of a curve, and is not a point obtained by extracting a characteristic point unlike other attributes, a visual change when this attribute is reduced is obscure. For this reason, this attribute has the fifth priority order of an anchor point candidate in all the attributes.

Note that attributes to be appended to anchor points are not limited to those described in this embodiment, and they may be defined in more detail. Alternatively, the processing may be executed using only some of the aforementioned attributes in correspondence with characteristics of an image to be processed.

[Control Point Decision Processing]

Figure 16:
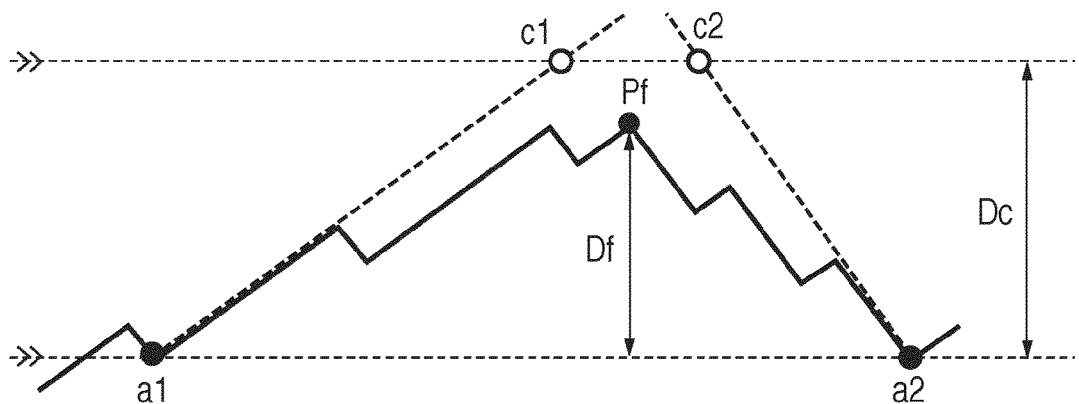
FIG. 16 is an explanatory view associated with control point coordinate decision processing according to the first embodiment.

Control point decision processing to be executed in steps S140 and S150 will be described below. This processing can adopt a method disclosed in Japanese Patent Laid-Open No. 2005-310070. That is, assume that a line segment $c1c2$ which connects control points c1 and c2 is parallel to a line segment $a1a2$ which connects anchor points a1 and a2, as shown in FIG. 16. Letting $D_f$ be a distance between a point $P_f$ on a sequence of coordinate points, which is most distant from the line segment $a1a2$, and the line segment $a1a2$, and $D_c$ be a distance between the line segments $a1a2$ and $c1c2$, since a relation $D_c=4/3D_f$ holds, the line segment $c1c2$ is uniquely defined. Then, tangents to the anchor points a1 and a2 are respectively decided, and intersections between the tangential directions and the line segment $c1c2$ are uniquely defined as the control points c1 and c2. At this time, the tangential directions at the respective anchor points are decided by tangential direction decision processing in step S140. The tangential directions are used to control a curvature upon approximation by a cubic Bézier curve. For this reason, at respective anchor points, tangential directions have to be decided in consideration of a coordinate point shape of a section partitioned between anchor points. In this embodiment, this tangential direction decision processing is easily implemented using the attributes obtained at the time of the anchor point candidate information extraction processing. Let $R_k$ (k=1, 2, . . . , l) be a sequence of coordinate points obtained by the anchor point decision processing in step S130, $R_{k-1}$, $R_{k-2}$, . . . be coordinate points in a reverse direction of the sequence of coordinate points tracking direction, and $R_{k+1}$, $R_{k+2}$, . . . be coordinate points in a forward direction of the sequence of coordinate points tracking direction.

[Tangential Direction Decision Processing]

Figure 17:
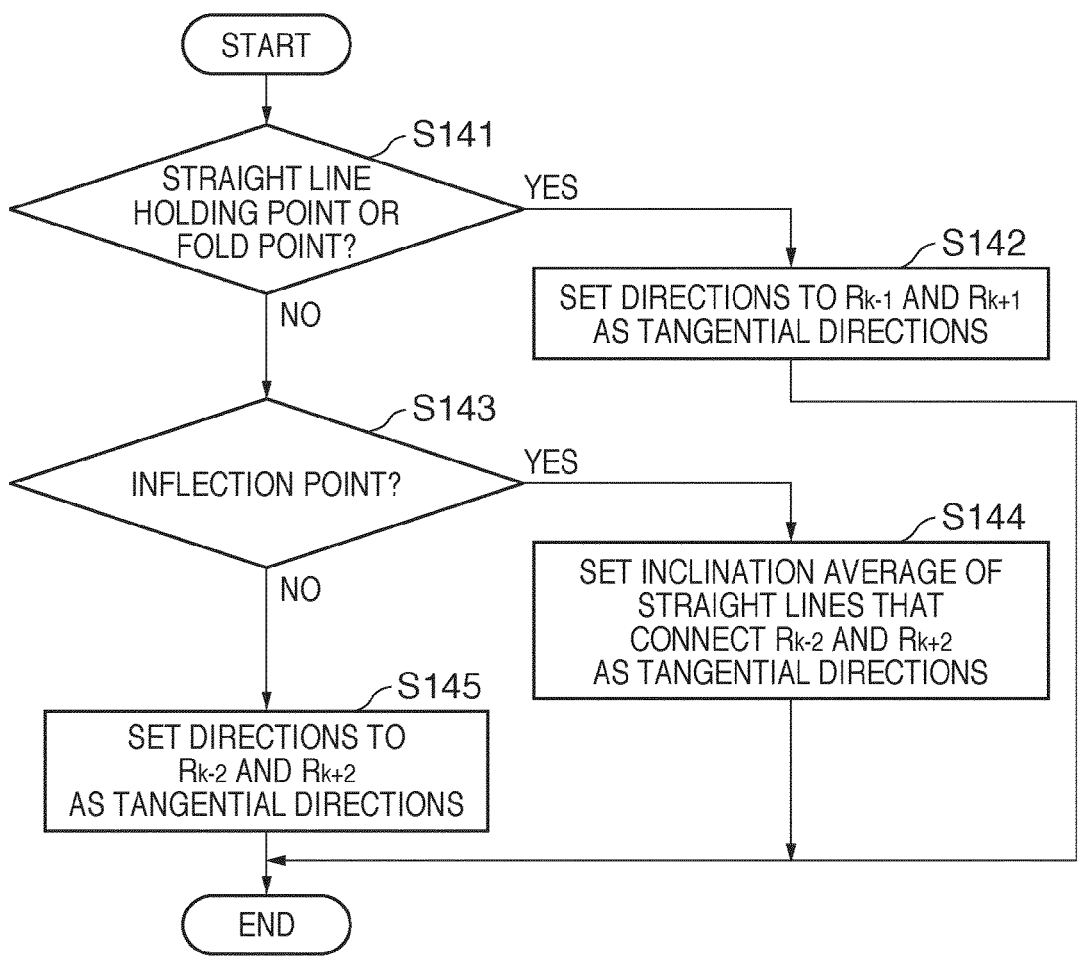
FIG. 17 is a flowchart showing tangential direction decision processing according to the first embodiment.

FIG. 17 is a flowchart showing the detailed sequence of the tangential direction decision processing executed by the CPU 7 in step S140. In step S141, the CPU 7 refers to the attribute of an anchor point as a target, the tangential directions of which are to be decided, and determines whether or not the attribute is "straight line holding point" or "fold point". If the attribute of the anchor point is "straight line holding point" or "fold point", the process advances to step S142 to set directions to neighboring coordinate points $R_{k-1}$ and $R_{k+1}$ as tangential directions, as shown in FIG. 18C or 18B, thus ending the processing. If it is determined in step S141 that the attribute is neither "straight line holding point" nor "fold point", the process advances to step S143. The CPU 7 determines in step S143 whether or not the attribute is "inflection point". If the attribute is "inflection point", the process advances to step S144. In step S144, the CPU 7 calculates inclinations of straight lines that connect an anchor point $R_k$ and coordinate points $R_{k-2}$ and $R_{k+2}$ two points before and after the anchor point $R_k$, and calculates an average of the calculated inclinations, as shown in FIG. 18F. The average of the inclinations may fall within an error range (first error) equal to or smaller than a threshold T6. Then, the CPU 7 sets, as tangential directions, directions which are opposite to each other, based on the calculated average of the inclinations, thus ending the processing. At this time, these directions may be accurately 180° (that is, these tangents are in direct opposition to each other), or may fall within an error range (second error) equal to or smaller than a threshold T7. As examples of the thresholds T6 and T7, T6=0.1 and T7=1.0 may be defined. If it is determined in step S143 that the attribute is not "inflection point", the process advances to step S145. In step S145, the CPU 7 sets, as tangential directions, directions to the coordinate points $R_{k-2}$ and $R_{k+2}$ two points before and after the anchor point as a target, the tangential directions of which are to be decided, thus ending the processing. The aforementioned processing implements a tangential direction decision unit 1400 shown in FIG. 3.

[Tangential Direction]

Tangential directions for the respective attributes will be described below. Since "fold point" expresses an angulated portion in the sequence of coordinate points of the input image, it is desirable to set tangential directions to be perpendicular to each other in approximate sections before and after "fold point". Hence, when directions to coordinate points that neighbor "fold point" are set as tangential directions, as shown in FIG. 18B, the tangential directions can be set to be perpendicular to each other, thus allowing an angulated expression.

Next, since "straight line holding point" holds a straight line portion of the sequence of coordinate points of the input image and smoothly connects a neighboring approximate section, it is desirable to set tangential directions before and after "straight line holding point" in directions which are parallel and opposite to each other. Hence, when directions to coordinate points, which neighbor "straight line holding point", are set as tangential directions, as shown in FIG. 18C, the tangential directions can be set to be parallel and opposite to each other, thus allowing to smoothly connect a neighboring approximate section while holding a straight line.

Since "vertex" expresses an edge or an extremal point of a moderate curve of the sequence of coordinate points of the input image, tangential directions can be directions which consider curvatures in approximate sections before and after "vertex". Hence, when directions to coordinate points two points before and after "vertex" are set as tangential directions, as shown in FIG. 18D, moderate "vertex" can assure moderate tangential directions, while steep "vertex" can assure tangential directions of an acute angle, thus allowing to express a moderate extremal point and steep edge.

Since "bent point" expresses an acute angle change in the sequence of coordinate points of the input image, it is desirable to set tangential directions that consider a change in curvature of approximate sections before and after "bent point". Hence, when directions to coordinate points two points before and after "bent point" are set as tangential directions, as shown in FIG. 18E, the tangential directions can be independently set for approximate sections before and after "bent point", and a change in curvature can be additionally considered, thus allowing to express an acute angle change.

Since "inflection point" defines a point where the signs of inclination change amounts change in the middle of a curve, it is desirable to set tangential directions in directions to be parallel and opposite to each other in approximate sections before and after "inflection point" and to smoothly connect these sections. Hence, when inclinations of directions to coordinate points two points before and after "inflection point" are calculated, and tangential directions are set as directions having an average of these inclinations, as shown in FIG. 18F, the tangential directions can be set in directions which are parallel and opposite to each other, and curves can be smoothly connected.

Finally, "corner point" need not consider connections of approximate sections before and after "corner point" since there is no coordinate point before or after it. For this reason, since a direction to a coordinate point two points after "corner point" on the sequence of coordinate points including coordinate points is set as a tangential direction, as shown in FIG. 18A, the tangential direction according to a curvature of the sequence of coordinate points as an approximate section can be set.

[Control Point Coordinate Calculation Processing]

The tangential directions at the anchor points can be decided by the processing executed so far. Next, the CPU 7 executes control point coordinate calculation processing in step S150. In this processing, the CPU 7 searches sequences of coordinate points in sections divided by anchor points for the coordinate point $P_f$ which is most distant from the line segment $a1a2$ which connects the anchor points. Then, the CUP 7 calculates the distance $D_f$ between the detected coordinate point $P_f$ and the line segment $a1a2$. Based on this distance $D_f$, the CPU 7 derives the line segment $c1c2$ which is parallel to the line segment $a1a2$ and is separated from the line segment $a1a2$ by the distance $D_c=4/3\times D_f$. Then, the CPU 7 decides, as control points, intersections between the derived line segment $c1c2$ and the tangential directions of the anchor points decided in step S140. At this time, when there is no coordinate point between the anchor points $a1$ and $a2$, the tangential directions of the two anchor points are opposite to each other, or a value obtained by dividing the length of the line segment $a1a2$ by the distance $D_f$ is equal to or smaller than the threshold T5, the CPU 7 decides that this section is a straight line portion, and does not output any control point. In this embodiment, the threshold T5=30. The aforementioned processing implements a control point coordinate calculation unit 1500 in FIG. 3. Also, steps S140 and S150 implement a control point coordinate decision unit 300.

Figure 26:
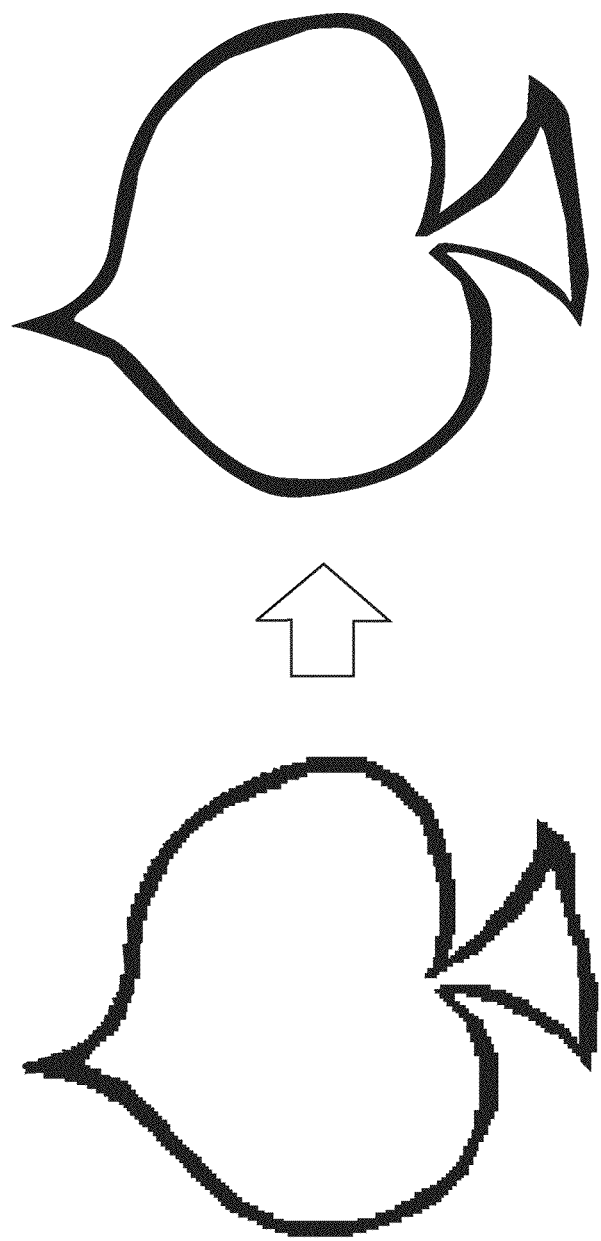
FIG. 26 is a view showing an input image and a vectorization result obtained upon application of the present invention.

Finally, the CPU 7 connects points having the same coordinates and attribute "corner point" of the generated data, and outputs the data as vector data in step S160. This processing implements a data output unit 400 in FIG. 3. With the aforementioned processing, vector data shown in FIG. 26 is finally obtained.

Second Embodiment

In the first embodiment, in the anchor point decision processing, when another anchor point candidate exists within two coordinate points before and after the anchor point coordinate of interest, the reduction processing is executed. However, when coordinate points included in anchor point candidates are separated by three points or more, even when a redundant anchor point candidate is included, it cannot be reduced. Hence, in this embodiment, the priority orders of neighboring anchor point candidates are compared, and the reduction processing is then executed. When the reduction processing is executed after comparison of anchor point candidates, the reduction result is overwritten on anchor point candidate information, and neighboring anchor point candidates in the overwritten result are determined again. As a result, the reduction processing in a broader range can be executed, thus contributing to a reduction of a data size.

Figure 19:
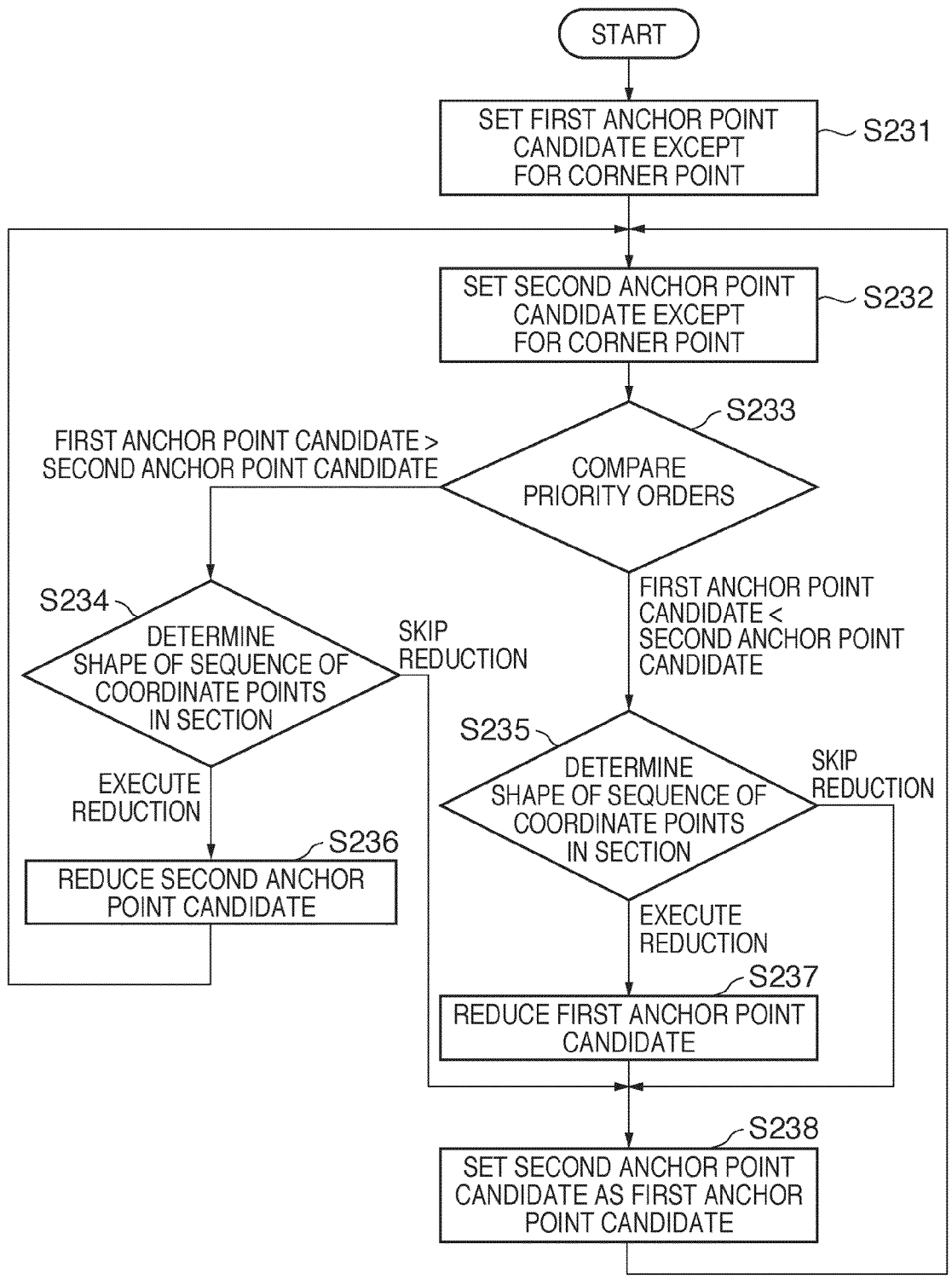
FIG. 19 is a flowchart showing anchor point decision processing according to the second embodiment.

FIG. 19 is a flowchart showing the processing sequence of this embodiment executed by the CPU 7. The CPU 7 tracks a sequence of coordinate points to extract an anchor point candidate, which is detected first, as a first anchor point candidate in step S231. In step S232, the CPU 7 further tracks the sequence of coordinate points from the first anchor point candidate to extract an anchor point candidate, which is detected next, as a second anchor point candidate. In step S233, the CPU 7 compares the priority orders of attributes of the first and second anchor point candidates. If the priority order of the second anchor point candidate is lower, the process advances to step S234. In step S234, the CPU 7 determines a shape of a sequence of coordinate points of a section partitioned by the first and second anchor point candidates. Elements used to determine the shape include, for example, the angle, length, number of coordinate points, and number of reduced anchor point candidates of the sequence of coordinate points. If it is determined that reduction processing is to be executed, the process advances to step S236 to reduce the second anchor point candidate, and the process returns to step S232. If it is determined that reduction processing is skipped, the process advances to step S238.

If it is determined in step S233 that the priority order of the first anchor point candidate is lower than or is equal to that of the second anchor point candidate, the process advances to step S235. In step S235, the CPU 7 determines the shape of the sequence of coordinate points of the section partitioned by the first and second anchor point candidates as in step S234. Elements used to determine the shape include, for example, the angle, length, number of coordinate points, and number of reduced anchor point candidates of the sequence of coordinate points. If it is determined that reduction processing is to be executed, the process advances to step S237 to reduce the first anchor point candidate, and the process then advances to step S238. If it is determined that reduction processing is skipped, the process jumps to step S238. In step S238, the CPU 7 sets a current point of interest as the second anchor point candidate to be the first anchor point candidate, and the process returns to step S232.

The CPU 7 repeats the aforementioned processing until the number of processed coordinate points reaches the total number of coordinate points in open and closed contours. With this processing, anchor point candidates can be compared in turn according to the tracking direction of the sequence of coordinate points, and the anchor point decision processing, which is not limited by the number of coordinate points between anchor point candidates, can be executed.

Third Embodiment

In the anchor point candidate information extraction processing in the first embodiment, a sequence of coordinate points extracted in the previous step is tracked, as shown in FIG. 9, to extract anchor point candidate information. In such case, since attributes such as "inflection point" and "bent point", which are to be extracted using a change in angle, require to calculate an angle of a sequence of coordinate points, determination processing is executed every other points, as shown in FIG. 20A.

Figure 20A:
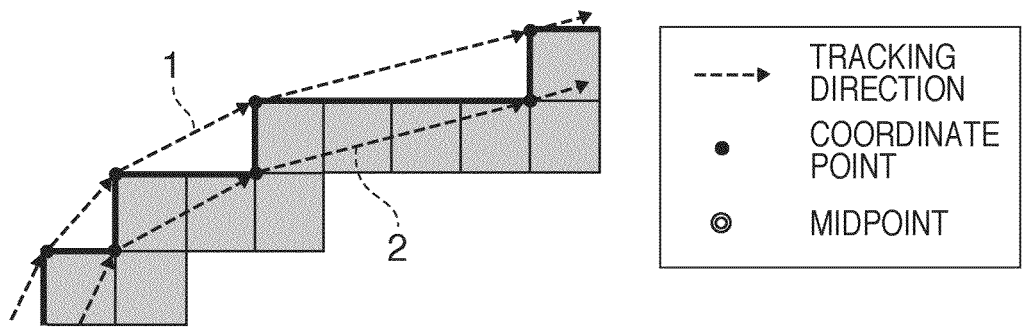
FIGS. 20A and 20B are views showing a difference in coordinate point tracking of the first and third embodiments.
Figure 20B:
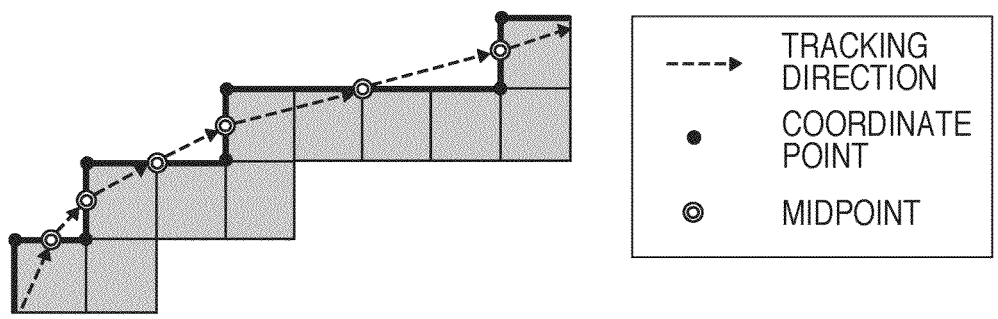

However, at this time, even in a single sequence of coordinate points, an extraction result obtained upon determining a coordinate point 1 in FIG. 20A is different from that obtained upon determining a coordinate point 2 in FIG. 20A, and final approximation results do not often match in the two cases. To solve this problem, in the anchor point candidate information extraction processing in step S120 of FIG. 4 in the first embodiment, "inflection point" and "bent point" whose anchor point candidate information is to be extracted using an angle change may be determined using midpoints of sides that connect respective sequences of coordinate points, as shown in FIG. 20B. That is, the processing sequence shown in the flowchart of FIG. 10 may be processed along the flowchart shown in FIG. 22. Note that the same processes other than the anchor point candidate information extraction processing as those in the first embodiment can be executed.

Figure 21:
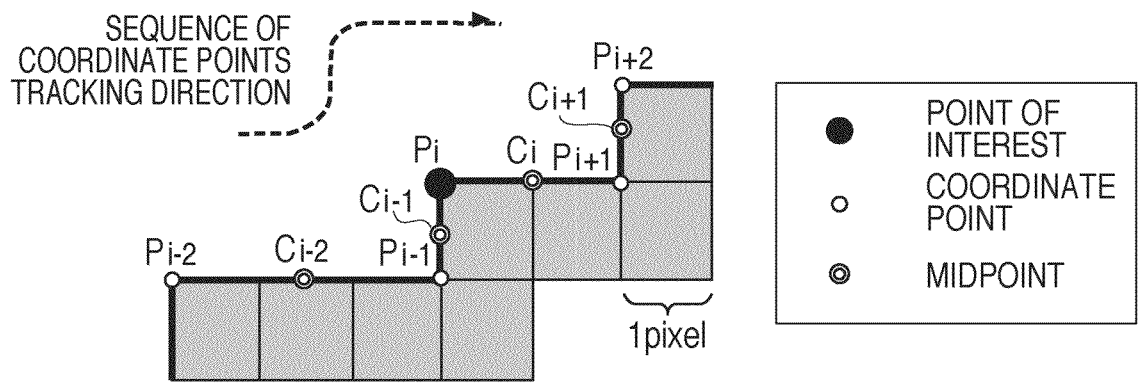
FIG. 21 is a view showing a point of interest, surrounding coordinate points, and midpoints according to the third embodiment.

In this case, let $P_i$ (i=1, 2, ... n) be a current point of interest of a sequence of coordinate points, as shown in FIG. 21. Also, let be $P_{i-1}, P_{i-2}, \ldots$ be coordinate points in a reverse direction of the sequence of coordinate points tracking direction when viewed from the point $P_i$ of interest, and let $P_{i+1}, P_{i+2}, \ldots$ be coordinate points in a forward direction of the sequence of coordinate points tracking direction. Furthermore, let $C_l$ (l=1, 2, ..., n-1) be a midpoint of a side which connects the coordinate points $P_i$ and $P_{i+1}$. Then, let $C_{l-1}, C_{l-2}, \ldots$ be midpoints defined between coordinate points in a reverse direction of the sequence of coordinate points tracking direction when viewed from the point $P_i$ of interest, and let $C_{l+1}, C_{l+2}, \ldots$ be midpoints defined between coordinate points in a forward direction of the sequence of coordinate points tracking direction.

Figure 22:
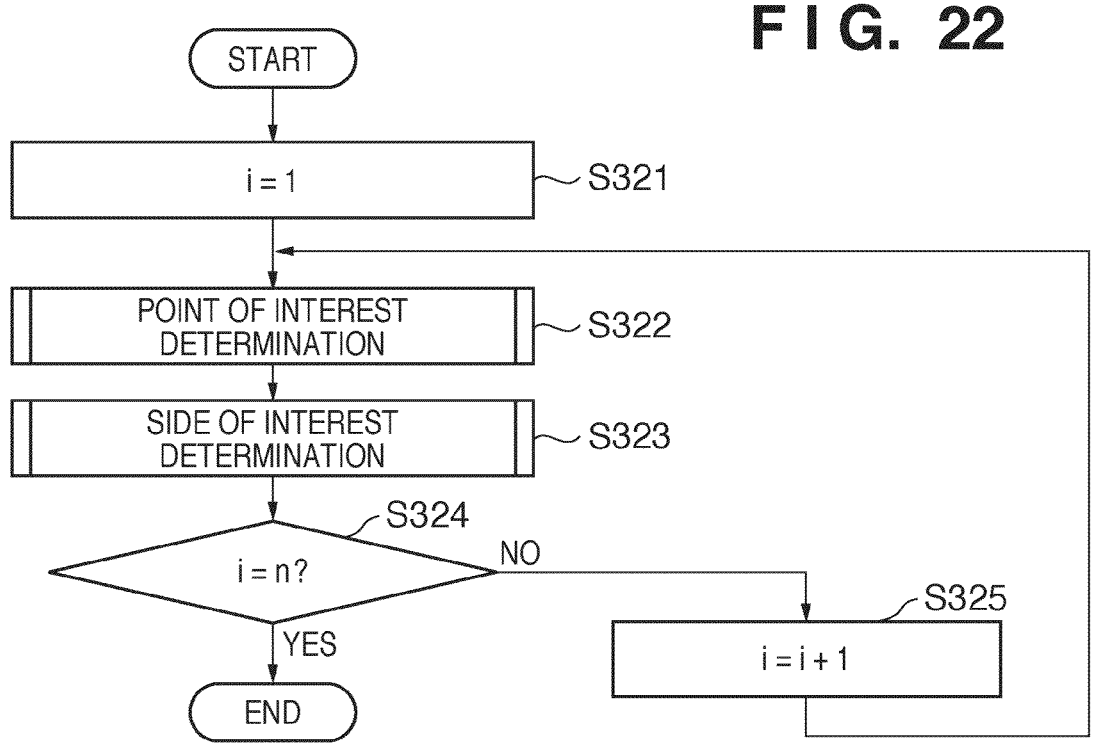
FIG. 22 is a flowchart showing anchor point candidate information extraction processing according to the third embodiment.

Details of the anchor point candidate information extraction processing of this embodiment will be described below using the flowchart shown in FIG. 22. In step S321, the CPU 7 sets an initial point of a sequence of coordinate points to be tracked, and selects that coordinate point as a point of interest. Next, the CPU 7 determines in step S322 whether or not the point $P_i$ of interest itself is set as an anchor point candidate.

Figure 23:
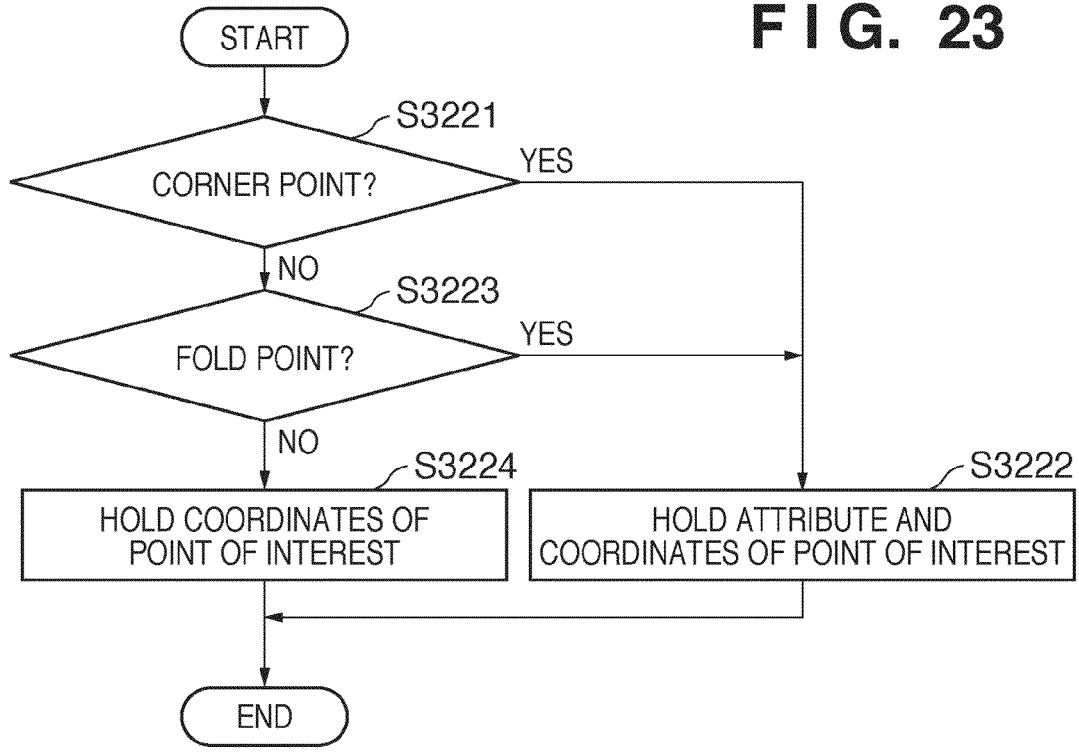
FIG. 23 is a flowchart showing anchor point candidate determination processing according to the third embodiment.

FIG. 23 is a flowchart showing the detailed sequence of point of interest determination processing executed by the CPU 7. The CPU 7 determines in step S3221 whether or not the point of interest is a corner point. This processing can be the same as that in step S1221 of FIG. 11 in the first embodiment. If it is determined that the point of interest is a corner point, the process advances to step S3222 to hold the coordinates of the point $P_i$ of interest itself and an attribute "corner point", thus ending the processing. If it is determined in step S3221 that the point of interest is not a corner point, the process advances to step S3223 to determine whether or not the point of interest is a fold point. This processing can be the same as that in step S1223 of FIG. 11 in the first embodiment. If it is determined that the point of interest is a fold point, the process advances to step S3222 to hold the coordinates of the point $P_i$ of interest itself and an attribute "fold point", thus ending the processing. If it is determined in step S3223 that the point of interest is not a fold point, the process advances to step S3224. Then, the CPU 7 holds only the coordinates of the point $P_i$ of interest itself, thus ending the processing.

Figure 24:
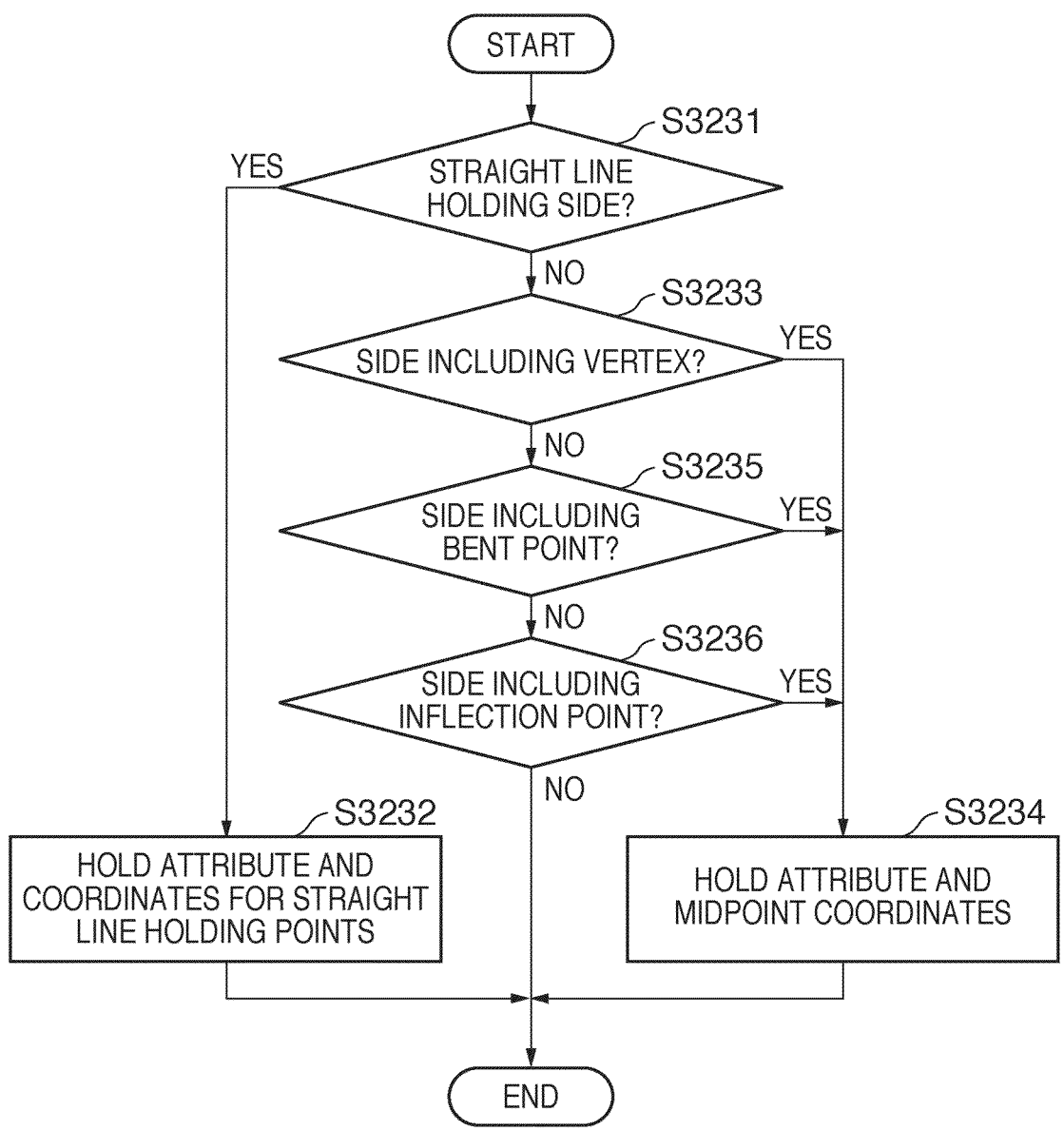
FIG. 24 is a flowchart showing anchor point candidate determination processing according to the third embodiment.

The anchor point candidate determination processing of the point $P_i$ of interest itself in step S322 is complete by the processing executed so far. Then, in FIG. 22, the process advances to step S323 to determine whether or not an anchor point candidate is to be set on a side $P_iP_{i+1}$ of interest. FIG. 24 is a flowchart showing the detailed sequence of side of interest determination processing to be executed by the CPU 7. The CPU 7 determines in step S3231 whether or not the side $P_iP_{i+1}$ of interest is a straight line holding side. This processing can be the same as that in step S1231 of FIG. 12 in the first embodiment. If it is determined that the side $P_iP_{i+1}$ of interest is a straight line holding side, the process advances to step S3232. Then, the CPU 7 sets two coordinate points, and holds these points to have an attribute "straight line holding point", as in the first embodiment, thus ending the processing.

Figure 25B:
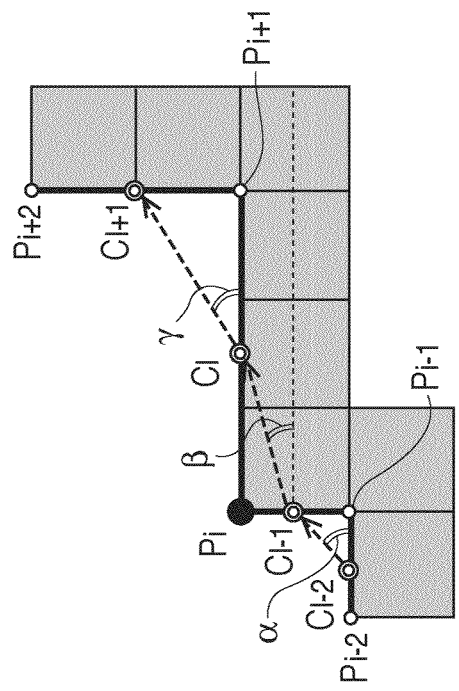
FIGS. 25A and 25B are views showing an example of extraction rules of a bent point and inflection point according to the third embodiment.
Figure 25A:
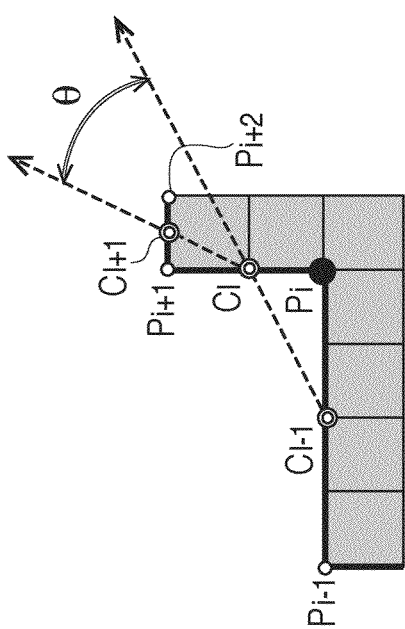

If it is determined in step S3231 that the side $P_iP_{i+1}$ of interest is not a straight line holding side, the process advances to step S3233 to determine whether or not the side of interest is a side including a vertex. This processing can be the same as that in step S1233 of FIG. 12 in the first embodiment. If it is determined that the side $P_iP_{i+1}$ of interest is a side including a vertex, the process advances to step S3234. Then, the CPU 7 holds midpoint coordinates of the line segment $P_iP_{i+1}$ of interest and an attribute "vertex", thus ending the processing. If it is determined in step S3233 that the side $P_iP_{i+1}$ of interest is not a side including a vertex, the process advances to step S3235 to determine whether or not the side of interest is a side including a bent point. In order to determine a side including a bent point, the CPU 7 sets midpoint coordinates $C_l$ of the side $P_iP_{i+1}$ of interest, midpoint coordinates $C_{l-1}$ of a side $P_{i-1}P_i$, and midpoint coordinates $C_{l+1}$ of a side $P_iP_{i+1}$ as reference points, and calculates an angle θ line segments $C_{l-1}C_l$ and $C_lC_{l+1}$ make, as shown in FIG. 25A. Then, the CPU 7 determines a side having the angle θ equal to or larger than a threshold T8 as a side including a bent point. In this embodiment, the threshold T8=25°. If it is determined that the side $P_iP_{i+1}$ of interest is a side including a bent point, the process advances to step S3234. Then, the CPU 7 holds midpoint coordinates $C_l$ of the line segment $P_iP_{i+1}$ and an attribute "bent point", thus ending the processing.

If it is determined in step S3235 that the side $P_iP_{i+1}$ of interest is not a side including a bent point, the process advances to step S3236 to determine whether or not the side of interest is a side including an inflection point. In order to determine a side including an inflection point, the CPU 7 sets midpoint coordinates $C_l$ of the side $P_iP_{i+1}$ of interest, midpoint coordinates $C_{l-1}$ of a side $P_{i-1}P_i$, midpoint coordinates $C_{l-2}$ of a side $P_{i-2}P_{i-1}$, and midpoint coordinates $C_{l+1}$ of a side $P_iP_{i+1}$ as reference points, as shown in FIG. 25B. Then, the CPU 7 calculates an inclination α of a line segment $C_{l-2}C_{l-1}$, an inclination β of a line segment $C_{l-1}C_l$, and an inclination γ of a line segment $C_lC_{l+1}$. The CPU 7 calculates inclination change amounts β−α and γ−β, and sets a point where the signs of the inclination change amounts are switched as an inflection point. However, when an absolute value of the inclination change amount β−α is equal to or smaller than a threshold T9, the determination is repeated while tracing back a line segment which assumes the inclination α to $C_{l-3}C_{l-2}$, $C_{l-4}C_{l-3}$, ... until the absolute value of β−α assumes a value equal to or larger than the threshold T9. In this embodiment, the threshold $T9=1.0\times10^{-7}$. If it is determined that the side $P_iP_{i+1}$ of interest is a side including an inflection point, the process advances to step S3234. Then, the CPU 7 holds the midpoint coordinates $C_l$ of the line segment $P_iP_{i+1}$ and an attribute "inflection point", thus ending the processing. If it is determined in step S3236 that the side $P_iP_{i+1}$ of interest is not a side including an inflection point, the processing ends.

The anchor point candidate determination processing of the side $P_iP_{i+1}$ of interest in step S323 is complete by the processing executed so far. Next, the CPU 7 determines in step S324 in FIG. 22 whether or not the current point of interest is an end point of the tracked sequence of coordinate points. If it is determined that the point of interest is not an end point, the CPU 7 selects a next point on the sequence of coordinate points as a point of interest in step S325, and the process returns to step S322. If it is determined that the point of interest is an end point, the anchor point candidate information extraction processing ends.

When the aforementioned processing is executed as the anchor point candidate information extraction processing, an inflection point and bent point which are to be extracted using an angle change do not require any determination as to whether or not the point of interest is an even- or odd-numbered point, and an anchor point extraction result which has a one-to-one correspondence with the input sequence of coordinate points can be obtained.

Fourth Embodiment

In the anchor point candidate information extraction processing in the first embodiment, anchor point candidates are extracted in turn in descending order of priority order in the anchor point decision processing, and the extracted anchor point candidates hold uniquely decided attributes. However, a point having natures of a plurality of attributes may redundantly hold attributes. For example, when a point has attributes "bent point" and "inflection point", a higher priority order is set, and tangential directions are set in the same manner as in "inflection point". In this way, by changing the priority order and the tangential direction setting methods depending on combinations of redundant attributes, vectorization with higher precision can be implemented.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-079439, filed Mar. 30, 2010, which is hereby incorporated by reference herein in its entirety.

What is claimed is:

1. An image processing apparatus comprising:
    a determination unit configured to determine anchor point candidates and attributes of the anchor point candidates based on points that express a contour of an image;
    a comparison unit configured to compare an attribute of one of the anchor point candidates with attributes of two anchor point candidates next to the one anchor point candidate and two anchor point candidates next to the next two anchor point candidates; and
    a deletion unit configured to, in a case that the attribute of the one anchor point candidate is lower than at least one of the compared attributes of the four anchor point candidates in view of priority, delete the one anchor point candidate from the anchor point candidates.

2. The image processing apparatus according to claim 1, further comprising:
    a decision unit configured to decide control point coordinates based on the anchor point candidates which have not been deleted; and
    a data output unit configured to output the control point coordinates.

3. The image processing apparatus according to claim 1, wherein
    the priority is given to a fold point, a straight line holding point, a vertex, a bent point, and an inflection point in descending order.

4. The image processing apparatus according to claim 1, wherein
    an attribute includes one of a fold point and a straight line holding point, and
    the straight holding point is lower than the fold point in view of priority.

5. An image processing method comprising:
    determining anchor point candidates and attributes of the anchor point candidates based on points that express a contour of an image;
    comparing an attribute of one of the anchor point candidates with attributes of two anchor point candidates next to the one anchor point candidate and two anchor point candidates next to the next two anchor point candidates; and
    deleting, in a case that the attribute of the one anchor point candidate is lower than at least one of the compared attributes of the four anchor point candidates in view of priority, the one anchor point candidate from the anchor point candidates.

6. The image processing method according to claim 5, further comprising:
    deciding control point coordinates based on the anchor point candidates which have not been deleted; and
    outputting the control point coordinates.

7. The image processing method according to claim 5, wherein the priority is given to a fold point, a straight line holding point, a vertex, a bent point, and an inflection point in descending order.

8. The image processing method according to claim 5, wherein
an attribute includes one of a fold point and a straight line holding point, and
the straight holding point is lower than the fold point in view of priority.

9. A non-transitory computer-readable medium storing a program for causing a computer to execute an image processing method according to claim 5.

10. An image processing apparatus comprising a processor and memory, cooperating to function as:
an anchor point candidate information extraction unit configured to decide coordinates of anchor point candidates and attributes of the anchor point candidates based on a plurality of predetermined extraction rules and a sequence of coordinate points that expresses an outline of image data,
wherein a type of the attribute of the anchor point candidate decided by said anchor point candidate information extraction unit includes at least two of: a fold point indicating that an anchor point candidate of interest expresses an angulated portion in the sequence of coordinate points, a straight line holding point indicating that an anchor point candidate of interest expresses a straight line portion in the sequence of coordinate points, a vertex indicating that an anchor point candidate of interest expresses an edge or an extremal point of a curve in the sequence of coordinate points, a bent point indicating that an anchor point candidate of interest is a point where angles of line segments made based on the sequence of coordinate points change by not less than a predetermined value before and after the anchor point candidate of interest, and an inflection point indicating that an anchor point candidate of interest is a point where signs of inclination change amounts of line segments made based on the sequence of coordinate points are switched,
wherein said anchor point candidate information extraction unit decides the attribute of the anchor point candidate as the fold point when both sides respectively formed by the anchor point candidate and the coordinate points neighboring before and after the anchor point candidate have not less than a predetermined length and the directions of the sides change from a horizontal direction to a vertical direction or vice versa,
and wherein said anchor point candidate information extraction unit decides the attribute of the anchor point candidate as the straight line holding point, the anchor point candidate being set at a position separated by predetermined distances respectively from corner points of a side having a length larger than that of a neighboring side by a constant value,
and wherein said anchor point candidate information extraction unit decides the attribute of the anchor point candidate as the vertex, the anchor point candidate being set at a midpoint of line segment made based on the sequence of coordinate points, directions of sides before and after the line segment being opposite to each other,
and wherein said anchor point candidate information extraction unit decides the attribute of the anchor point candidate as the bent point when the angle of line segments is not less than the predetermined value, the line segments being made with the anchor point candidate of interest and coordinate points located at positions separated from the anchor point candidate of interest by a distance of two coordinate points,
and wherein said anchor point candidate information extraction unit decides the attribute of the anchor point candidate as the inflection point when the anchor point candidate of interest is a point where signs of inclination change amounts of line segments made with the anchor point candidate of interest and the coordinate points are switched;
an anchor point decision unit configured to decide an anchor point candidate to be reduced based on the attributes of the anchor point candidates and priority orders set in advance for the attributes, and configured to decide anchor points by reducing the decided anchor point candidates to be reduced;
a control point coordinate decision unit configured to decide control point coordinates based on the anchor points decided by said anchor point decision unit and the sequence of coordinate points; and
a data output unit configured to output information including the coordinates of the decided anchor points and the decided control point coordinates.

11. An image processing method performed by an image processing apparatus comprising a processor and memory, said method comprising:
deciding coordinates of anchor point candidates and attributes of the anchor point candidates based on a plurality of predetermined extraction rules and a sequence of coordinate points that expresses an outline of image data,
wherein a type of the attribute of the anchor point candidate decided in the deciding includes at least two of: a fold point indicating that an anchor point candidate of interest expresses an angulated portion in the sequence of coordinate points, a straight line holding point indicating that an anchor point candidate of interest expresses a straight line portion in the sequence of coordinate points, a vertex indicating that an anchor point candidate of interest expresses an edge or an extremal point of a curve in the sequence of coordinate points, a bent point indicating that an anchor point candidate of interest is a point where angles of line segments made based on the sequence of coordinate points change by not less than a predetermined value before and after the anchor point candidate of interest, and an inflection point indicating that an anchor point candidate of interest is a point where signs of inclination change amounts of line segments made based on the sequence of coordinate points are switched,
wherein the attribute of the anchor point candidate is decided as the fold point in the deciding when both sides respectively formed by the anchor point candidate and the coordinate points neighboring before and after the anchor point candidate have not less than a predetermined length and the directions of the sides change from a horizontal direction to a vertical direction or vice versa,
and wherein the attribute of the anchor point candidate is decided as the straight line holding point in the deciding, the anchor point candidate being set at a position separated by predetermined distances respectively from corner points of a side having a length larger than that of a neighboring side by a constant value,
and wherein the attribute of the anchor point candidate is decided as the vertex in the deciding, the anchor point candidate being set at a midpoint of line segment made based on the sequence of coordinate points, directions of sides before and after the line segment being opposite to each other, and wherein the attribute of the anchor point candidate is decided as the bent point in the deciding when the angle of line segments is not less than the predetermined value, the line segments being made with the anchor point candidate of interest and coordinate points located at positions separated from the anchor point candidate of interest by a distance of two coordinate points, and wherein the attribute of the anchor point candidate is decided as the inflection point in the deciding when the anchor point candidate of interest is a point where signs of inclination change amounts of line segments made with the anchor point candidate of interest and the coordinate points are switched;

deciding an anchor point candidate to be reduced based on the attributes of the anchor point candidates and priority orders set in advance for the attributes, and deciding anchor points by reducing the decided anchor point candidates to be reduced;

deciding control point coordinates based on the anchor points decided in the second deciding and the sequence of coordinate points; and outputting information including the coordinates of the decided anchor points and the decided control point coordinates.

* * * * *